United States Patent
Takasaki et al.

(10) Patent No.: US 8,098,398 B2
(45) Date of Patent: Jan. 17, 2012

(54) PRINTING SYSTEM, PRINTING APPARATUS, AND PREVIEW METHOD FOR PRINTING SYSTEM

(75) Inventors: Tetsuhide Takasaki, Tokyo (JP);
Tadanobu Fujita, Yokohama (JP);
Hiroshi Shintoku, Kawasaki (JP);
Hiroshi Okubo, Kawasaki (JP); Yasuo Kurata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 12/338,831

(22) Filed: Dec. 18, 2008

(65) Prior Publication Data
US 2009/0168081 A1 Jul. 2, 2009

(30) Foreign Application Priority Data
Dec. 27, 2007 (JP) .................. 2007-337666

(51) Int. Cl.
*G06K 15/02* (2006.01)
(52) U.S. Cl. .................. 358/1.2; 358/1.9; 358/1.18
(58) Field of Classification Search .................. None
See application file for complete search history.

(56) References Cited

U.S. PATENT DOCUMENTS

| | | | |
|---|---|---|---|
| 6,256,109 B1 | 7/2001 | Rosenbaum et al. | |
| 2005/0088669 A1 | 4/2005 | Suino et al. | |
| 2005/0206916 A1 | 9/2005 | Nakagiri et al. | |
| 2005/0213154 A1* | 9/2005 | Narusawa et al. | 358/1.18 |
| 2006/0061805 A1 | 3/2006 | Kawamura | |
| 2006/0215197 A1 | 9/2006 | Tobioka | |

FOREIGN PATENT DOCUMENTS

| | | |
|---|---|---|
| EP | 1821189 A2 | 8/2007 |
| JP | 3769868 B | 4/2006 |
| KR | 10-2005-0076258 A | 7/2005 |
| KR | 10-2005-0104022 A | 11/2005 |

OTHER PUBLICATIONS

European Patent Office, European Search Report, Apr. 3, 2009.

* cited by examiner

*Primary Examiner* — Twyler Haskins
*Assistant Examiner* — Lennin Rodriguez
(74) *Attorney, Agent, or Firm* — Canon U.S.A., Inc. IP Division

(57) ABSTRACT

A printing system configured to set a segment unit size serving as a unit of a display area for displaying, as images, a list of pages which form the document; acquire a width and a height of each page image from the document data; calculate, when a value of a ratio of the width and the height of the page acquired in the acquiring exceeds a predetermined value, a display area size having a display region larger than the segment unit size; determine, for a page having the value of the ratio exceeding the predetermined value, an enlargement/reduction ratio so as to fit the page into the display area size; and display, a list of pages which form the document, by enlarging or reducing the page based on the enlargement/reduction ratio determined in the determining and displaying the page in a display screen at the display area.

7 Claims, 31 Drawing Sheets

F I G. 4
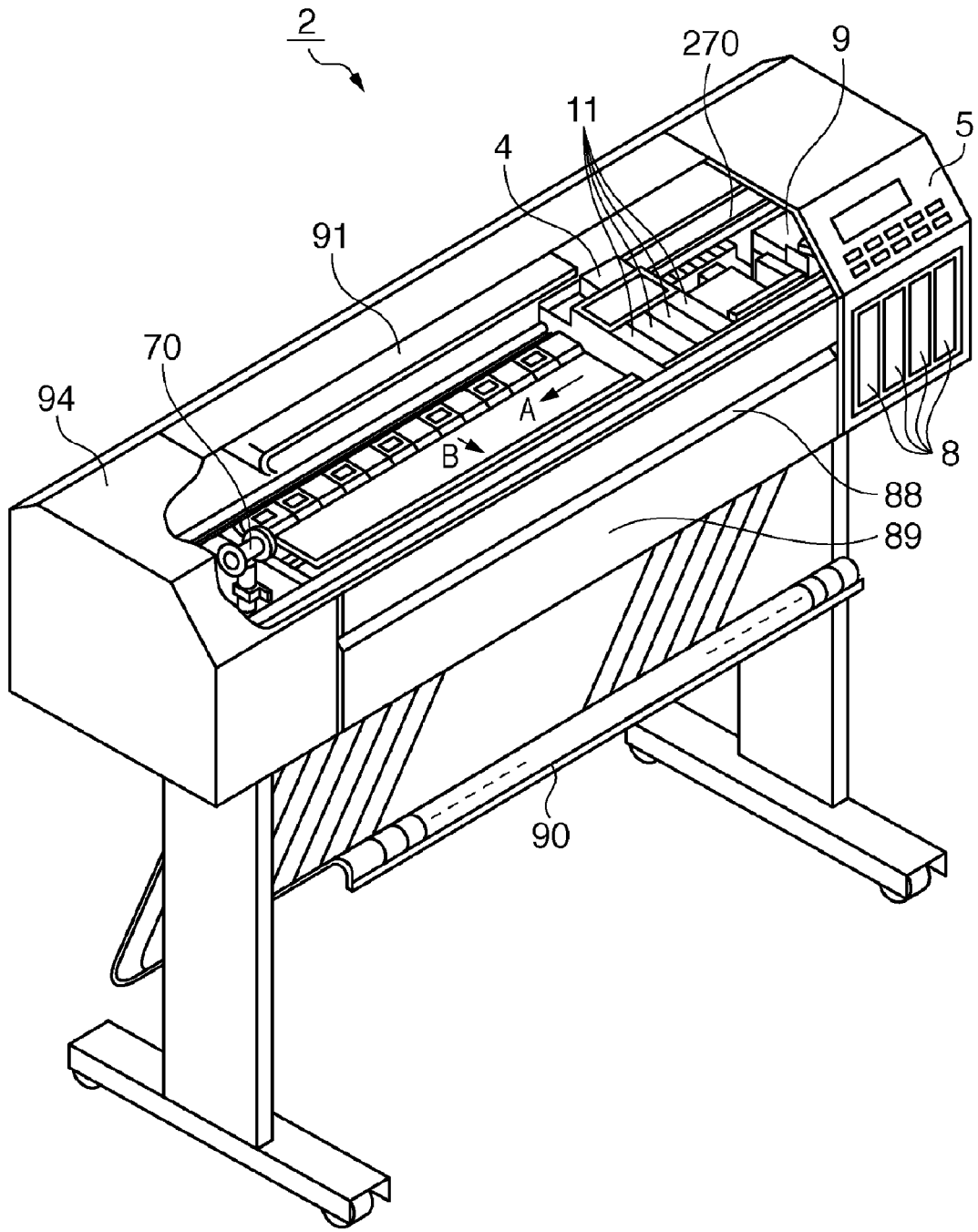

FIG. 22
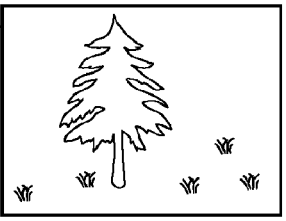
1901　WIDTH : 640 PIXELS
　　　HEIGHT : 480 PIXELS
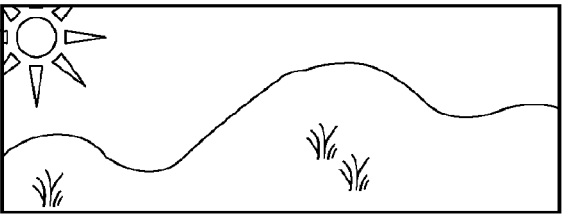
1902　WIDTH : 1280 PIXELS
　　　HEIGHT : 480 PIXELS
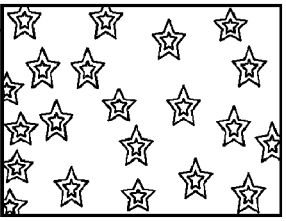
1903　WIDTH : 640 PIXELS
　　　HEIGHT : 480 PIXELS
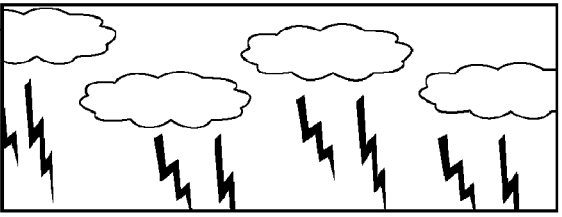
1904　WIDTH : 1280 PIXELS
　　　HEIGHT : 480 PIXELS
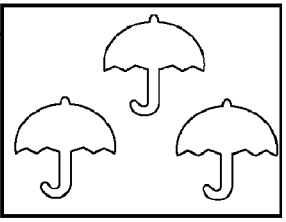
1905　WIDTH : 640 PIXELS
　　　HEIGHT : 480 PIXELS
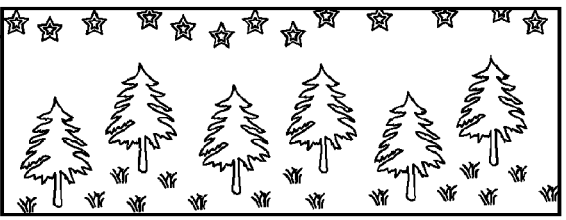
1906　WIDTH : 1280 PIXELS
　　　HEIGHT : 480 PIXELS

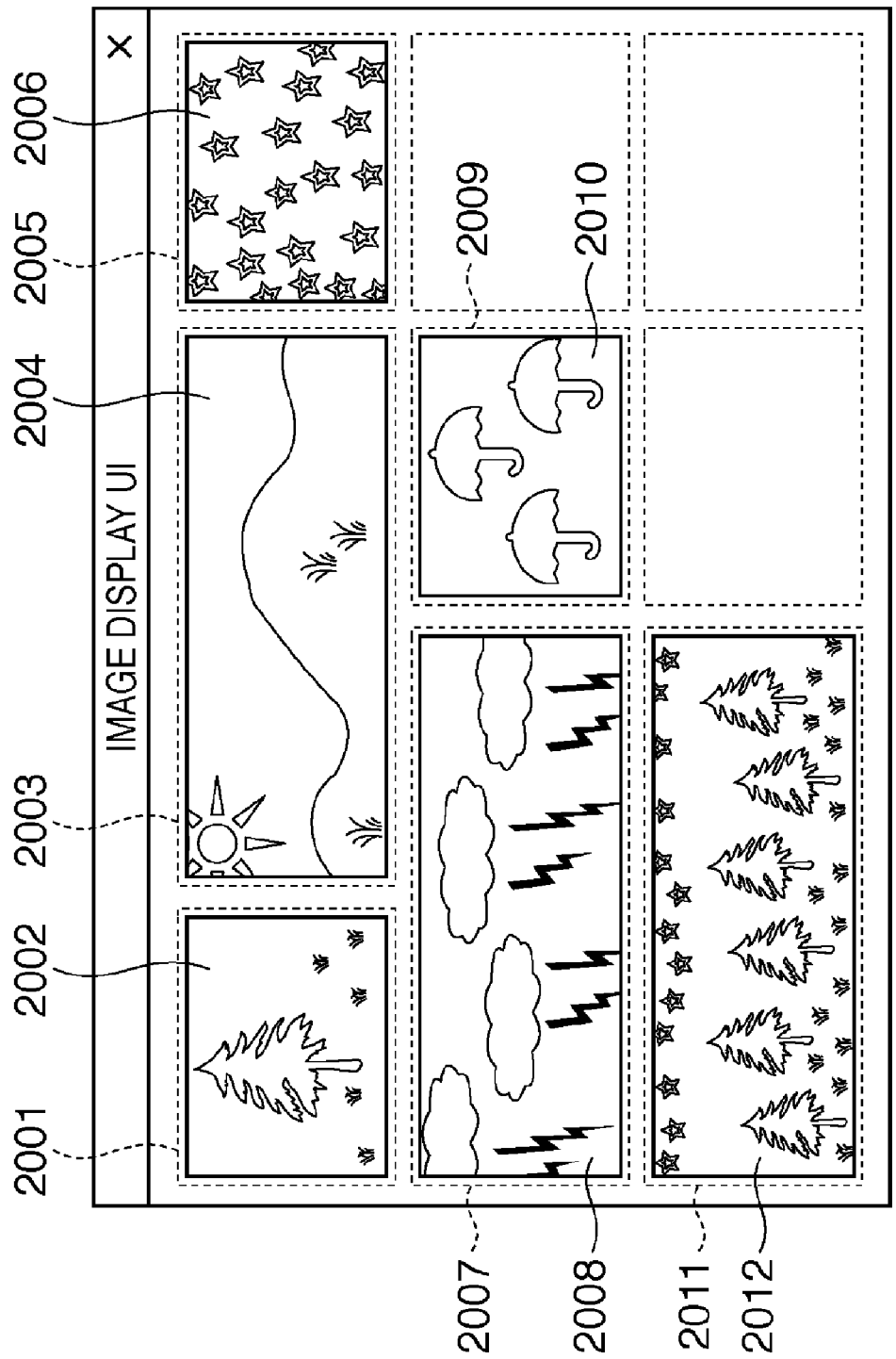

F I G. 25
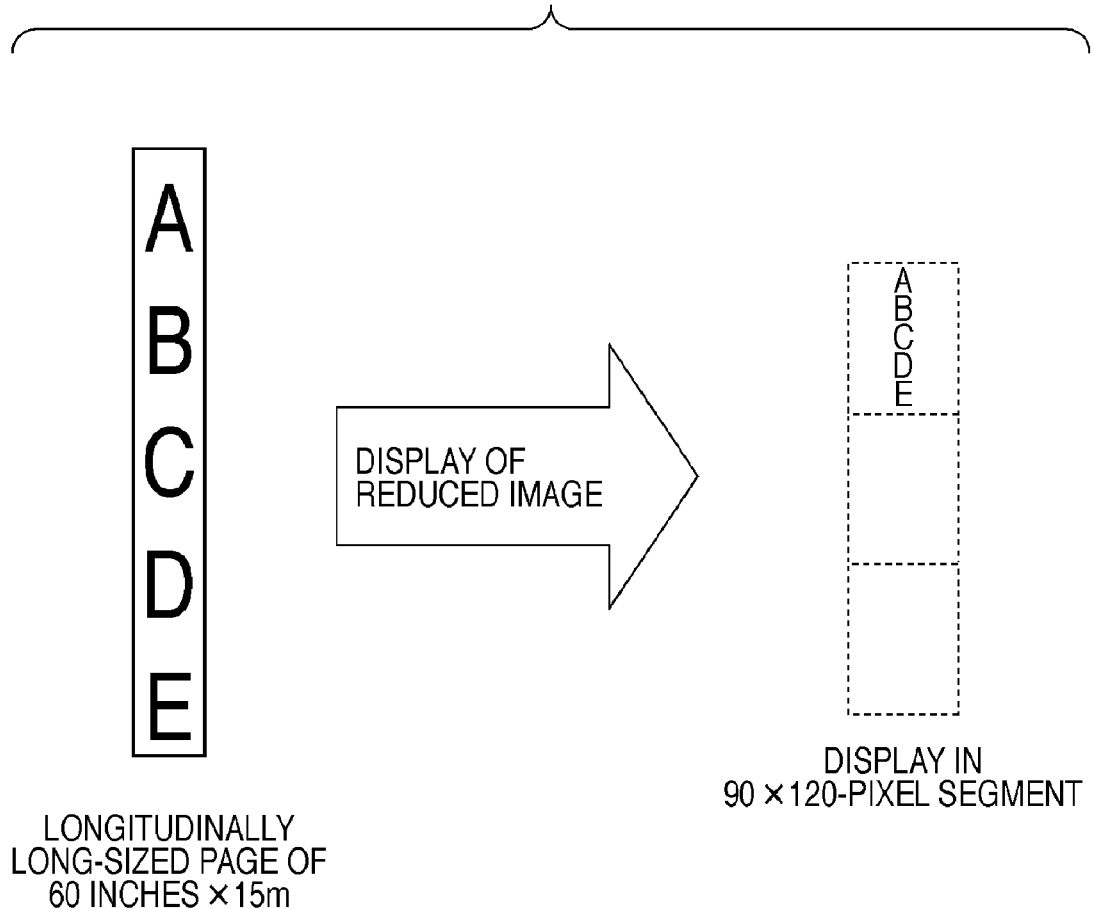

FIG. 26
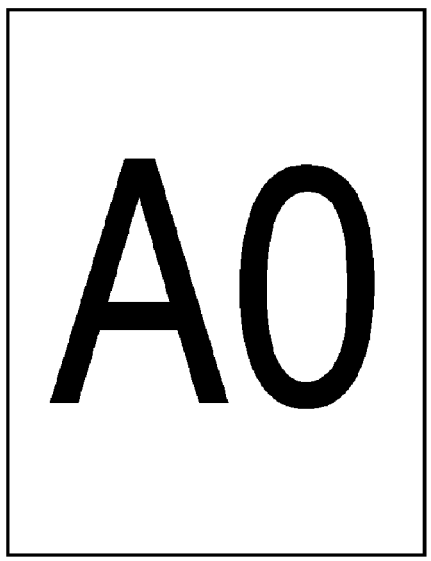
A0-SIZE PAGE :
84.0cm × 118.8cm
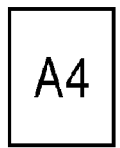
A4-SIZE PAGE :
21.0cm × 29.7cm
DISPLAY OF
REDUCED IMAGE
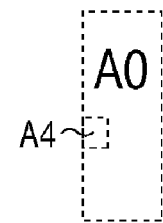
DISPLAY IN
90 × 120-PIXEL
SEGMENT

FIG. 27
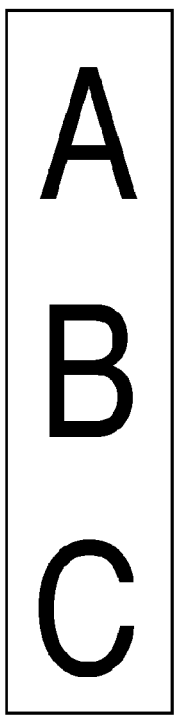
PAGE OF 1m × 4.5m
PAGE OF 4.5m × 1m
DISPLAY OF REDUCED IMAGE
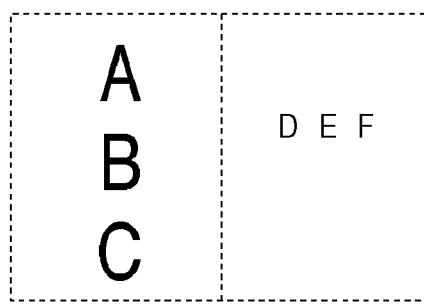
DISPLAY IN 90 × 120-PIXEL SEGMENT

FIG. 28
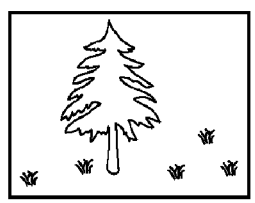
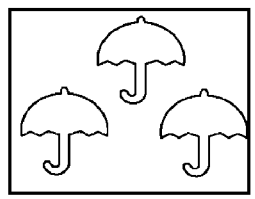
DISPLAY OF REDUCED IMAGE →
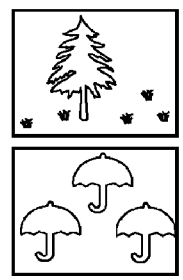
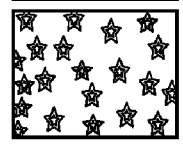
DISPLAY IN 160 × 120-PIXEL SEGMENT
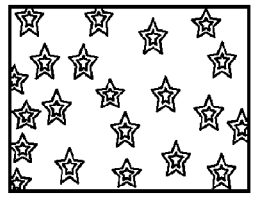
PAGE OF
25.6cm × 19.2cm

FIG. 29
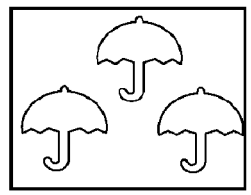
PAGE OF 25.6cm × 19.2cm
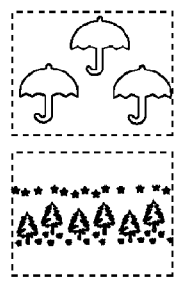
DISPLAY OF REDUCED IMAGES
DISPLAY IN 160 × 120-PIXEL SEGMENTS
PAGE OF 51.2cm × 19.2cm

PRINTING SYSTEM, PRINTING APPARATUS, AND PREVIEW METHOD FOR PRINTING SYSTEM

BACKGROUND OF THE INVENTION

1. Field of the Invention

The present invention relates to a printing system, printing apparatus, and preview method for the printing system and, more particularly, to a printing system, printing apparatus, and preview method for the printing system for displaying a list of pages of a document as reduced images.

2. Description of the Related Art

There has conventionally been proposed a display system having a user interface which allows the user to feel an overview of the page structure of a document, the contents of each page, and the like (see, e.g., Japanese Patent No. 3,769,868).

Many display systems have proposed a method of storing image data representing a document for each page, reducing the stored image data to fit it in a segment for reduction display, and selecting the reduced image of a corresponding page to display it.

The conventional methods are discussed with reference to FIGS. 25 to 29.

FIG. 25 is a view showing an example in which the reduced image of a longitudinally long-sized page becomes a line, degrading visual perceptibility.

Conventionally, as shown in FIG. 25, when displaying a list of pages of a document as reduced images, a predetermined segment is prepared, and a page is enlarged/reduced to fit it in the segment. If the reduction ratio is high when displaying the reduced image of a longitudinally long-sized page, the reduced image of the longitudinally long-sized page becomes a line, and the user cannot grasp the contents of the page.

FIG. 26 is a view showing an example in which the reduced images of a document with greatly different page sizes are displayed, degrading the visual perceptibility of the reduced image of a small-sized page.

As shown in FIG. 26, if the size is greatly different between pages, like A0 and A4 sizes, when displaying a list of pages of a document as reduced images, the image of a small-sized page becomes excessively small. As a result, the user cannot grasp the contents of the page.

FIG. 27 is a view showing an example in which the reduced images of both portrait and landscape pages are displayed, degrading the visual perceptibility of the reduced image of either image.

As shown in FIG. 27, when displaying the reduced images of a document containing both portrait and landscape pages in displaying a list of pages of the document as reduced images, the image of either page is excessively reduced. As a result, the user cannot grasp the contents of the page.

FIG. 28 is a view showing an example in which no sufficient blank is set between display areas for displaying a reduced image, degrading visual perceptibility.

As shown in FIG. 28, if no sufficient blank is set between display areas when displaying a list of pages of a document as reduced images, the visual perceptibility of the reduced images degrades.

FIG. 29 is a view showing an example in which the reduced image of longitudinally long-sized image data is displayed, failing in visually perceiving the contents of the image data.

Conventionally, as shown in FIG. 29, when displaying a list of image data as reduced images, a predetermined segment is prepared, and image data is enlarged/reduced and fit in the segment. In this case, the user might not be able to grasp the contents of the image data from the reduced image.

SUMMARY OF THE INVENTION

Accordingly, the present invention is conceived as a response to the above-described disadvantages of the conventional art.

For example, a printing system, printing apparatus, and preview method for the printing system according to this invention are capable of improving the visual perceptibility of a reduced image when displaying the reduced image as a preview.

According to one aspect of the present invention, there is provided a printing system including a host apparatus which generates document data of a document formed from a plurality of pages, and a printing apparatus which receives the document data from the host apparatus and prints an image based on the document data on a printing medium, the system comprising: segment unit size setting means for setting a segment unit size serving as a unit of a display area for displaying, as images, a list of pages which form the document; acquisition means for acquiring a width and a height of each page image from the document data; calculation means for, when a value of a ratio of the width and the height of the page acquired by the acquisition means exceeds a predetermined value, calculating, from the segment unit size, a display area size having a display region larger than the segment unit size; determination means for determining, for a page having the value of the ratio exceeding the predetermined value, an enlargement/reduction ratio so as to fit the page at the display area size; and display means for displaying, as images, a list of pages which form the document, by enlarging or reducing the page based on the enlargement/reduction ratio determined by the determination means and displaying the page at the display area size.

According to another aspect of the present invention, there is provided a printing apparatus which receives document data of a document generated in a host apparatus and formed from a plurality of pages, and prints an image based on the document data on a printing medium, the printing apparatus comprising: segment unit size setting means for setting a segment unit size serving as a unit of a display area for displaying, as images, a list of pages which form the document; acquisition means for acquiring a width and a height of each page image from the received document data; calculation means for, when a value of a ratio of the width and the height of the page acquired by the acquisition means exceeds a predetermined value, calculating, from the segment unit size, a display area size having a display region larger than the segment unit size; determination means for determining, for a page having the value of the ratio exceeding the predetermined value, an enlargement/reduction ratio so as to fit the page into the display area size; and display means for displaying, as images, a list of pages which form the document, by enlarging or reducing the page based on the enlargement/reduction ratio determined by the determination means and displaying the page at the display area size.

According to still another aspect of the present invention, there is provided a preview method for a printing system including a host apparatus which generates document data of a document formed from a plurality of pages, and a printing apparatus which receives the document data from the host apparatus and prints an image based on the document data on a printing medium, the method comprising the steps of: setting a segment unit size serving as a unit of a display area for displaying, as images, a list of pages which form the document; acquiring a width and a height of each page image from the document data; calculating, from the segment unit size, and when a value of a ratio of the width and the height of the page acquired in the acquiring exceeds a predetermined value, a display area size having a display region larger than the segment unit size; determining, for a page having the value of the ratio exceeding the predetermined value, an enlargement/reduction ratio so as to fit the page into the display area size; and displaying, as images, a list of pages which form the document, by enlarging or reducing the page based on the enlargement/reduction ratio determined in the determining and displaying the page in a display screen at the display area size.

According to still another aspect of the present invention, there is provided a computer-readable storage medium storing a program for causing a computer to execute the method for the printing system having the above-described configuration.

Embodiments of the invention are advantageous since, when displaying the reduced image of a longitudinally long-sized page, a segment size for displaying a reduced image becomes an integer multiple of a segment unit size in accordance with the ratio of the width and height of the page. Even if the reduction ratio is high, the reduced image of the longitudinally long-sized page does not become a line.

In addition, a failure in visually perceiving page contents can be prevented by embodiments of the invention. The segment size and enlargement/reduction ratio for displaying a reduced image are determined for each page. Thus, embodiments of the invention can address page contents that are not visually perceptible from an excessively reduced image of a small-sized page.

Since a blank is inserted between display areas, reduced images can be easily distinguished from each other, improving visual perceptibility.

For example, when displaying the reduced images of a document containing both portrait and landscape pages, a reduced image is rotated and displayed. This can prevent a failure in grasping page contents from an excessively reduced image of either page.

Accordingly, even when displaying the reduced image of a longitudinally long-sized page or displaying reduced images of greatly different page sizes, the visual perceptibility of reduced images improves.

Further features of the present invention will become apparent from the following description of exemplary embodiments with reference to the attached drawings.

BRIEF DESCRIPTION OF THE DRAWINGS

FIG. 4 is a schematic perspective view showing the outer appearance of the inkjet printing apparatus;

FIG. 22 is a view showing an example of image file data in the fourth embodiment of the present invention;

FIG. 23 is a view showing a reduced image displayed on a reduced image display user interface according to the fourth embodiment of the present invention;

FIG. 25 is a view showing an example in which the reduced image of a longitudinally long-sized page becomes a line, degrading visual perceptibility;

FIG. 26 is a view showing an example in which the reduced images of a document with greatly different page sizes are displayed, degrading the visual perceptibility of the reduced image of a small-sized page;

FIG. 27 is a view showing an example in which the reduced images of both portrait and landscape pages are displayed, degrading the visual perceptibility of the reduced image of either image;

FIG. 28 is a view showing an example in which no sufficient blank is set between display areas for displaying a reduced image, degrading visual perceptibility; and FIG. 29 is a view showing an example in which the reduced image of longitudinally long-sized image data is displayed, failing in visually perceiving the contents of the image data.

DESCRIPTION OF THE EMBODIMENTS

Figure 1:
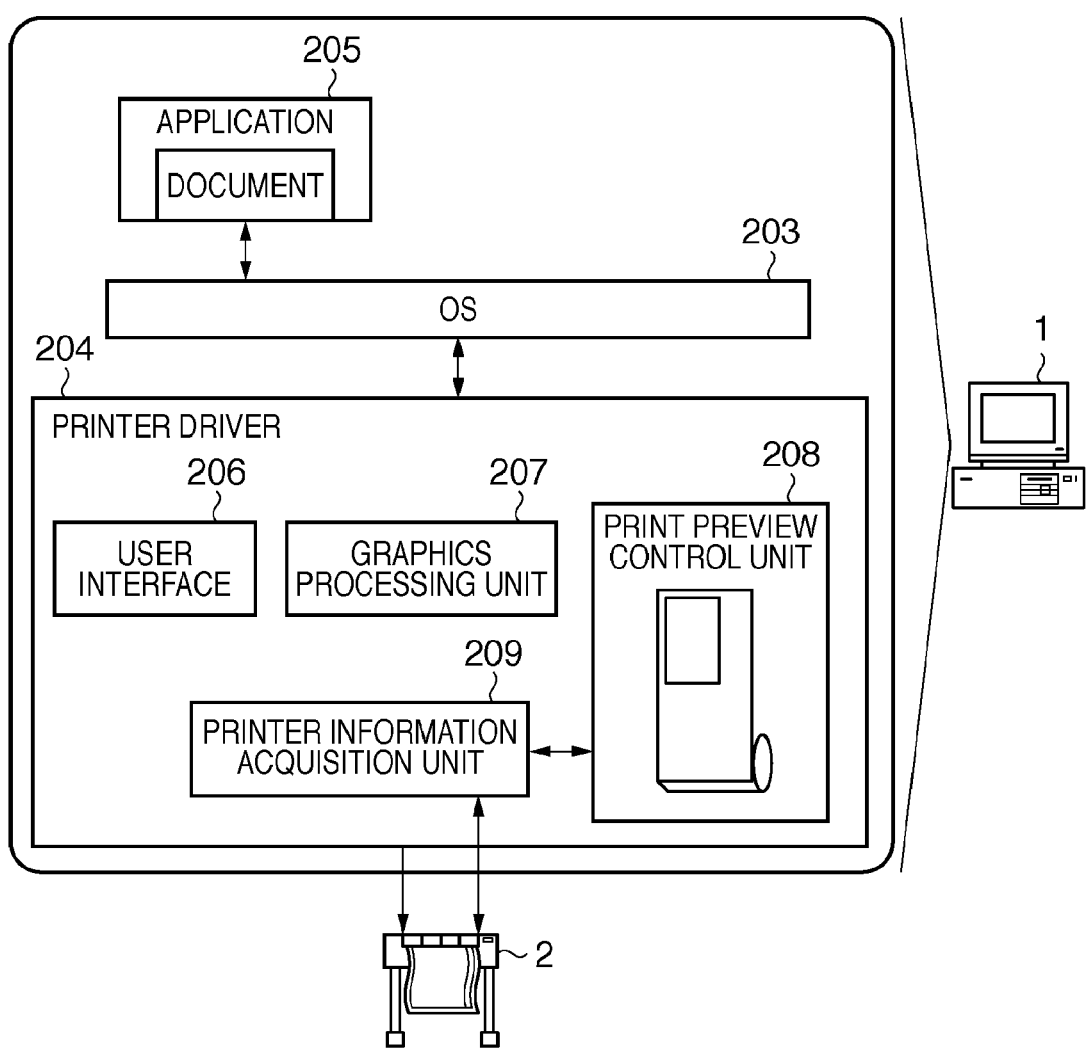
FIG. 1 is a block diagram showing the configuration of a printing system as a typical embodiment of the present invention.

Embodiments of the present invention will now be described in detail in accordance with the accompanying drawings. The same reference numerals denote the same parts, and a repetitive description thereof will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Furthermore, unless otherwise stated, the term "printing element" generally means a set of a discharge orifice, a liquid channel connected to the orifice and an element to generate energy utilized for ink discharge.

FIG. 1 is a block diagram showing the schematic configuration of a printing system as a typical embodiment of the present invention. As is apparent from FIG. 1, the system includes a host apparatus 1 such as a personal computer (PC), and a printer (printing apparatus) 2 which prints on large-sized printing media such as A0 and B0.

An operating system (to be referred to as an OS hereinafter) 203, a printer driver 204 serving as software for controlling the printer 2, and an application 205 for creating a variety of documents are installed in the host apparatus 1. In the host apparatus 1, the OS 203 and printer driver 204 operate to print various documents created by the application 205.

The printer driver 204 includes the following four functional units.

More specifically, the printer driver 204 includes a user interface 206 which accepts an input from the user, a graphics processing unit 207 which generates print data to be transmitted to the printer, and a print preview control unit 208 which controls a print preview for confirming a print layout and the like. In addition to these units, the printer driver 204 includes a printer information acquisition unit 209 which acquires various kinds of printer information such as information on the width of roll paper set in the printer and the current printer status.

The main features of the following embodiments of the present invention reside especially in the print preview control unit 208 of the printer driver 204.

Figure 2:
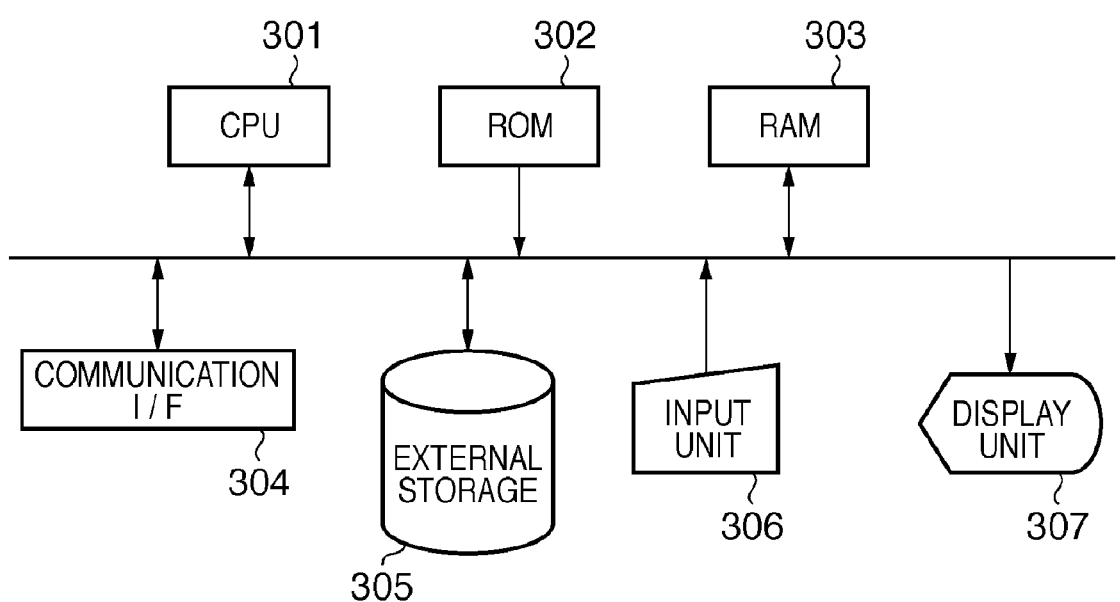
FIG. 2 is a block diagram showing the arrangement of a host apparatus.

FIG. 2 is a block diagram showing the arrangement of the host apparatus 1.

In FIG. 2, a CPU 301 performs various control operations of the overall host apparatus. A ROM 302 stores various data and initialization programs executed by the CPU 301 in activating the host apparatus. A RAM 303 is used as a main memory and work area for the CPU 301.

An external storage 305 is formed from, for example, a hard disk (HDD), and stores a variety of programs. Programs for implementing processes represented by flowcharts (to be described later) are loaded from the external storage (HDD) 305 into the RAM 303. An input unit 306 includes a keyboard, mouse, and the like, and inputs various instructions to the CPU 301. A display unit 307 formed from an LCD, CRT, or the like presents various displays under the control of the CPU 301. A communication interface 304 communicates with a peripheral device such as the printer 2.

The printer 2 includes a roll paper feed unit, and can print a document of an arbitrary length within a range permitted by the printer driver. When the printer 2 has a cut sheet feed port, it can also print not only on roll paper but also on a cut sheet.

Figure 3:
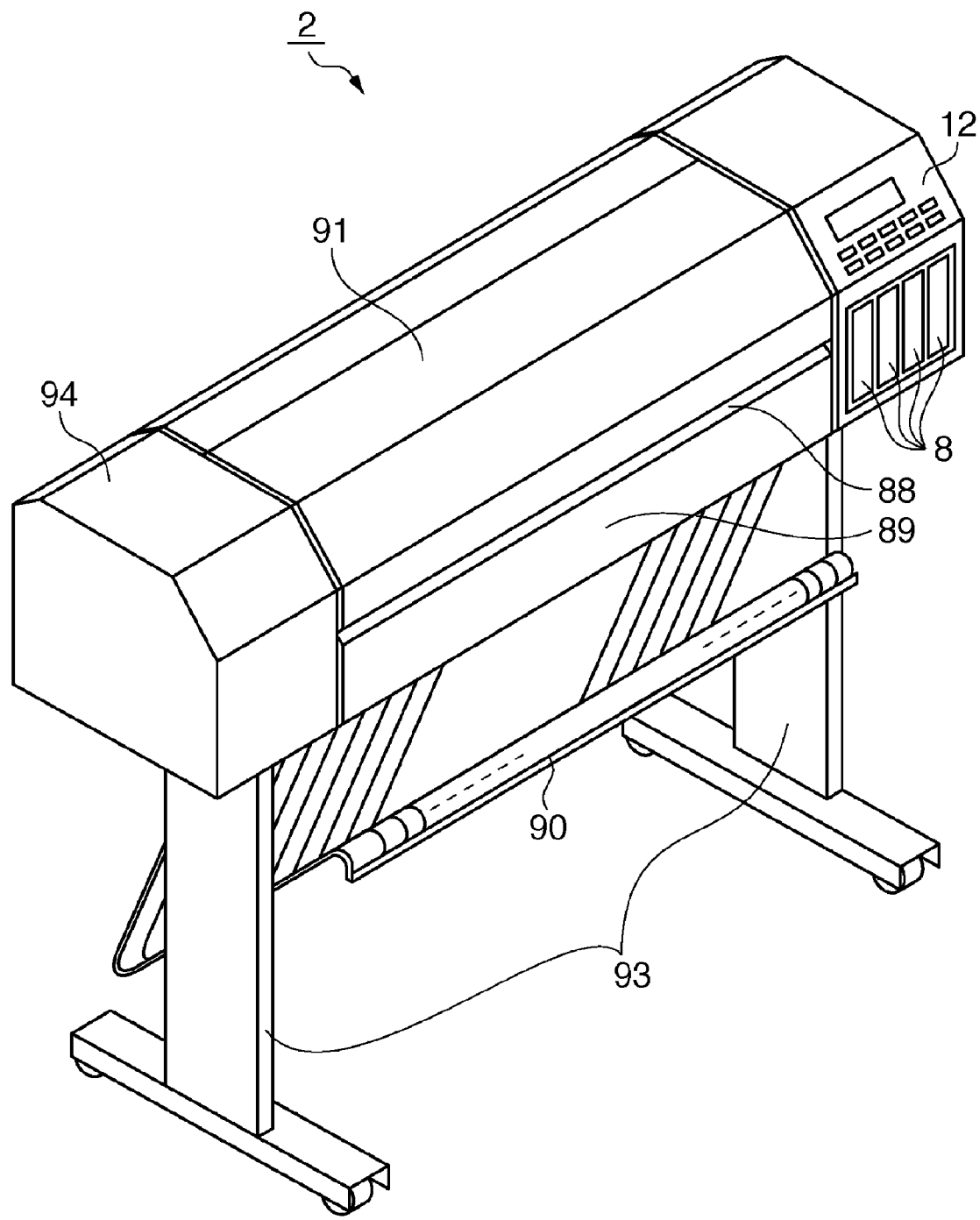
FIG. 3 is a schematic perspective view showing the outer appearance of an inkjet printing apparatus.

FIG. 3 is a perspective view showing the outer appearance of an inkjet printing apparatus as a typical embodiment of the printer (printing apparatus) 2. FIG. 4 is a perspective view showing a state in which the upper cover of the inkjet printing apparatus shown in FIG. 3 is removed.

As shown in FIGS. 3 and 4, the inkjet printing apparatus (to be referred to as a printing apparatus hereinafter) 2 has a manual insertion port 88 on the front surface, and a roll paper cassette 89 which can open to the front side is arranged below the manual insertion port 88. A printing medium such as printing paper is supplied from the manual insertion port 88 or roll paper cassette 89 into the printing apparatus. The inkjet printing apparatus includes an apparatus main body 94 supported by two legs 93, a stacker 90 which supports delivered printing media, and an openable see-through upper cover 91. An operation panel 12 and ink supply units 8 are arranged on the right side of the apparatus main body 94. A control unit 5 is arranged on the back side of the operation panel 12.

The printing apparatus 2 having this arrangement can print a large image in a poster size such as A0 or B0.

As shown in FIG. 4, the printing apparatus 2 includes a conveyance roller 70 for conveying a printing medium in a direction (sub-scanning direction) indicated by an arrow B, and a carriage unit (to be referred to as a carriage hereinafter) 4 which is guided and supported to be able to reciprocate in directions (indicated by an arrow A: main scanning direction) of the printing medium width. The carriage 4 receives a driving force from a carriage motor (not shown) via a carriage belt (to be referred to as a belt hereinafter) 270, and reciprocates in the directions indicated by the arrow A. An inkjet printhead (to be referred to as a printhead hereinafter) 11 is mounted on the carriage 4. A recovery unit 9 cancels an ink discharge failure caused by clogging of the orifice of the printhead 11 or the like.

In this printing apparatus, the carriage 4 supports the printhead 11 made up of four heads in correspondence with four color inks, in order to print in color on a printing medium. That is, the printhead 11 is formed from a K (black) head for discharging K ink, a C (Cyan) head for discharging C ink, an M (Magenta) head for discharging M ink, and a Y (Yellow) head for discharging Y ink. In this structure, the ink supply unit 8 includes four ink tanks respectively storing K, C, M, and Y inks.

When printing on a printing medium by the above-described arrangement, the conveyance roller 70 conveys a printing medium to a predetermined print start position. Then, an operation to scan the printhead 11 by the carriage 4 in the main scanning direction, and an operation to convey the printing medium by the conveyance roller 70 in the sub-scanning direction are repeated, printing on the entire printing medium.

More specifically, the carriage 4 moves in the directions indicated by the arrow A shown in FIG. 4 by the belt 270 and carriage motor, printing on a printing medium. The carriage 4 then returns to a position (home position) before scanning, and the conveyance roller conveys the printing medium in the sub-scanning direction. After that, the carriage scans again in the directions indicated by the arrow A in FIG. 4, printing an image, character, or the like on the printing medium. After this operation is repeated to end printing of one printing medium, the printing medium is discharged into the stacker 90, completing printing of, for example, one A0-size printing medium.

A reduced image display sequence using the print preview control unit 208 in accordance with a user operation will be explained.

The user creates her/his desired document by the application 205, and issues a print instruction from, for example, a menu provided by the application 205, displaying a print dialog. In general, the user can press a property button or the like in the print dialog of the application 205 to confirm or change the settings of a selected printer driver.

Figure 5:
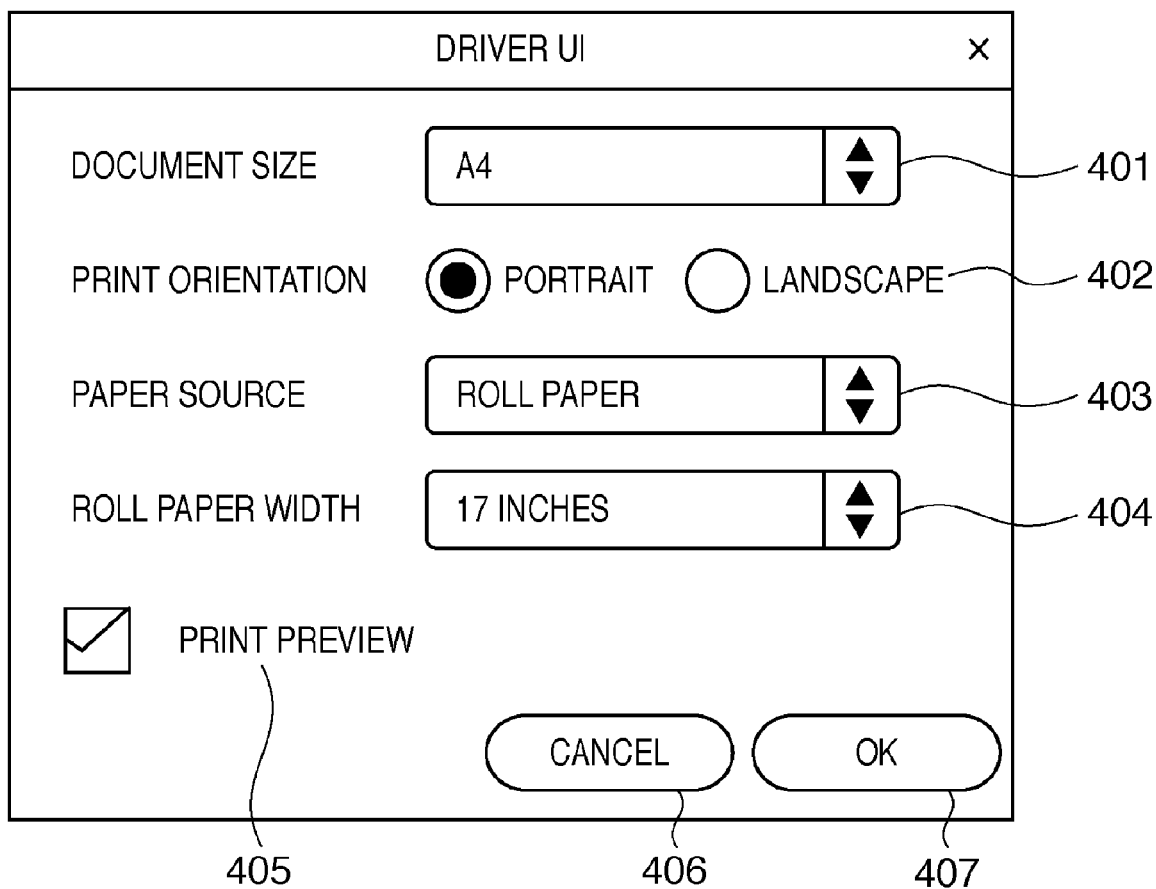
FIG. 5 is a view showing an example of a printer driver user interface.

FIG. 5 is a view showing an example of a user interface for confirming or changing the settings of the printer driver.

In FIG. 5, reference numeral 401 denotes a "document size" list box; 402, a "print orientation" radio button; 403, a "paper source" list box; 404, a "roll paper width" list box; and 405, a "print preview" check box. Reference numeral 406 denotes a "cancel" button; and 407, an "OK" button.

The user can set the document size from the "document size" list box 401. In FIG. 5, A4 is set as the document size. The "print orientation" radio button 402 sets the orientation of paper. In FIG. 5, portrait is set.

The "paper source" list box 403 sets a paper source in printing. In FIG. 5, roll paper is set. The "roll paper width" list box 404 sets the width of roll paper set in the printer. This setting is used when the print preview control unit (to be described later) cannot acquire roll paper width information from the printer information acquisition unit. In FIG. 5, 17 inches is set.

The "print preview" check box 405 sets whether or not to activate a print preview before printing. By checking the "print preview" check box 405, print preview processing is executed before printing. In FIG. 5, the "print preview" check box 405 is checked.

After these settings are made, the user presses the "OK" button 407 to finalize the settings. Then, the user interface of the printer driver disappears.

If the user presses the "cancel" button 406, changed settings are not validated, and the default settings of the printer driver or previously set contents are used. Then, the user interface of the printer driver disappears.

After the end of setting the printer driver, the user presses a control such as a print start button in the print dialog of the application, transferring document data to the printer driver. As described above, the "print preview" check box 405 is currently checked in the printer driver settings. Thus, the document data is transferred to the print preview control unit 208, activating the display system.

Figure 6:
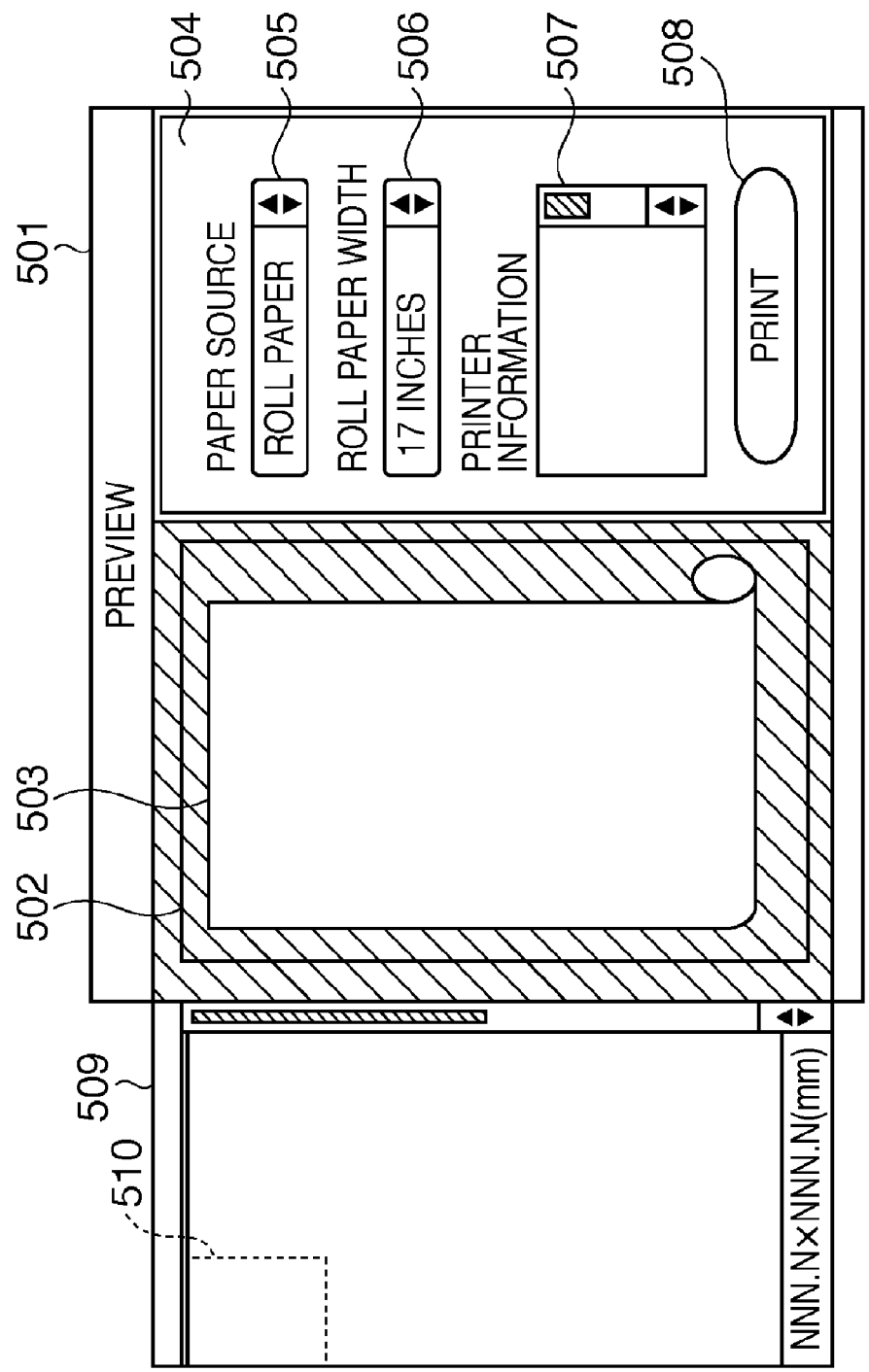
FIG. 6 is a view showing a user interface when a print preview control unit displays a reduced image in the vertical direction.

FIG. 6 is a view showing an example of a user interface when the print preview control unit 208 displays a reduced image in the vertical direction.

In FIG. 6, a print preview dialog 501 includes a print preview display portion 502, setting display/change portion 504, and reduced image display portion 509.

The print preview display portion 502 displays a paper image 503. The setting display/change portion 504 is formed from a paper source list box 505, roll paper width list box 506, printer information display text box 507, and print button 508.

The paper image 503 shows the paper image of a paper source designated in the paper source list box 505. The paper image 503 represents the paper image of a roll paper width designated in the roll paper width list box 506. The printer information display text box 507 displays various types of printer information acquired by the printer information acquisition unit 209.

The user checks a print image displayed at the print preview display portion 502, and if she/he wants to print with these contents, presses the print button 508 to output print data to the printer 2 and print it.

A display area 510 displays the reduced image of a document page.

The reduced image display portion 509 displays a reduced image in the vertical direction. When displaying a reduced image in the horizontal direction, a user interface shown in FIG. 7 is used.

Figure 7:
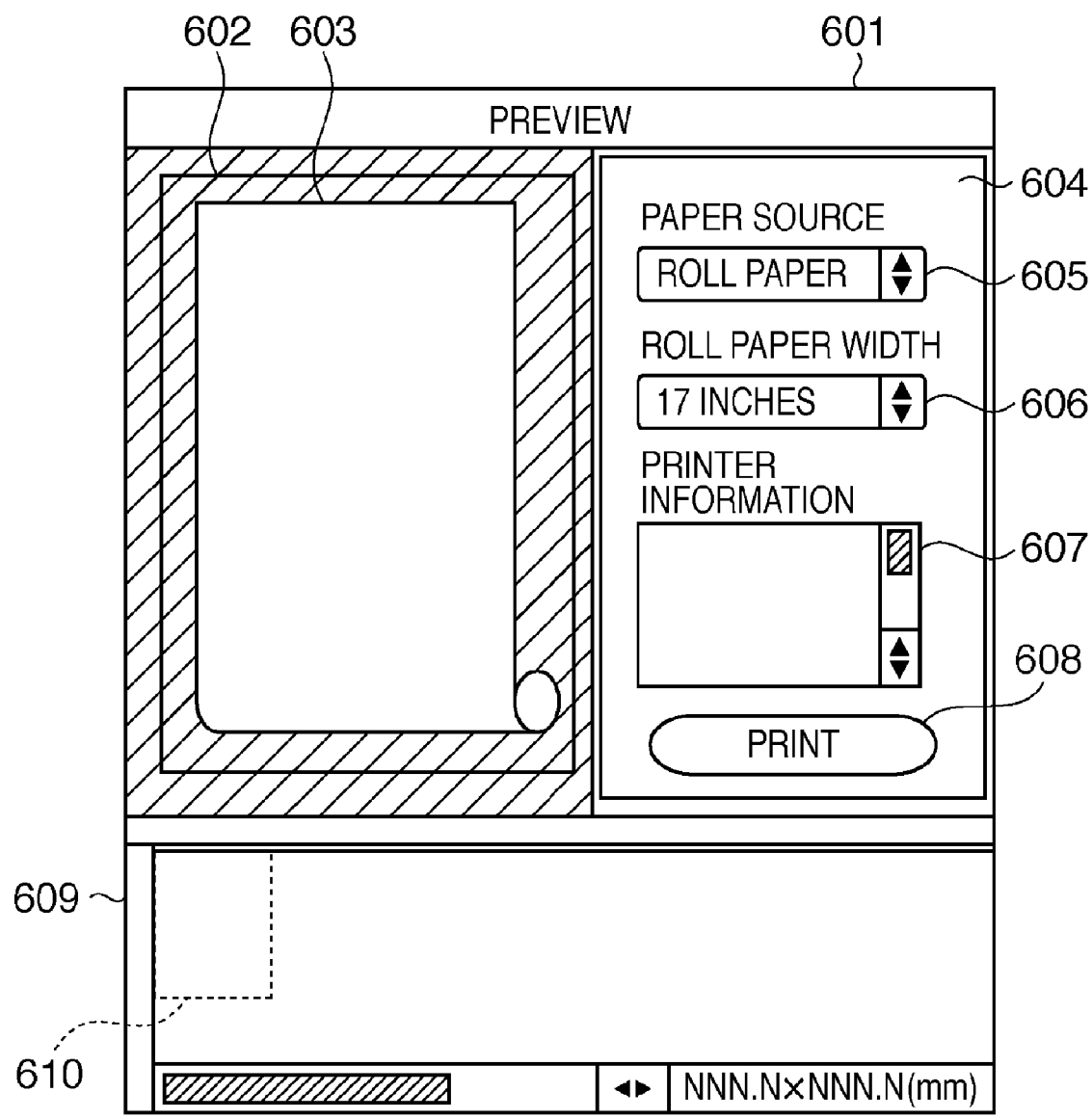
FIG. 7 is a view showing a user interface when the print preview control unit displays a reduced image in the horizontal direction.

FIG. 7 is a view showing an example of a user interface when the print preview control unit displays a reduced image in the horizontal direction.

In FIG. 7, reference numerals 601 to 608 denote the same functions as the functions 501 to 508 in FIG. 5, and a description thereof will not be repeated. A reduced image display portion 609 displays a reduced image in the horizontal direction. A display area 610 displays a reduced image in the horizontal direction, and is used for displaying the reduced image of a document page.

Several embodiments of preview processing executed in the printing system having the above-described configuration will be explained.

A first embodiment of the present invention will be described below referring to the drawings.

Figure 8:
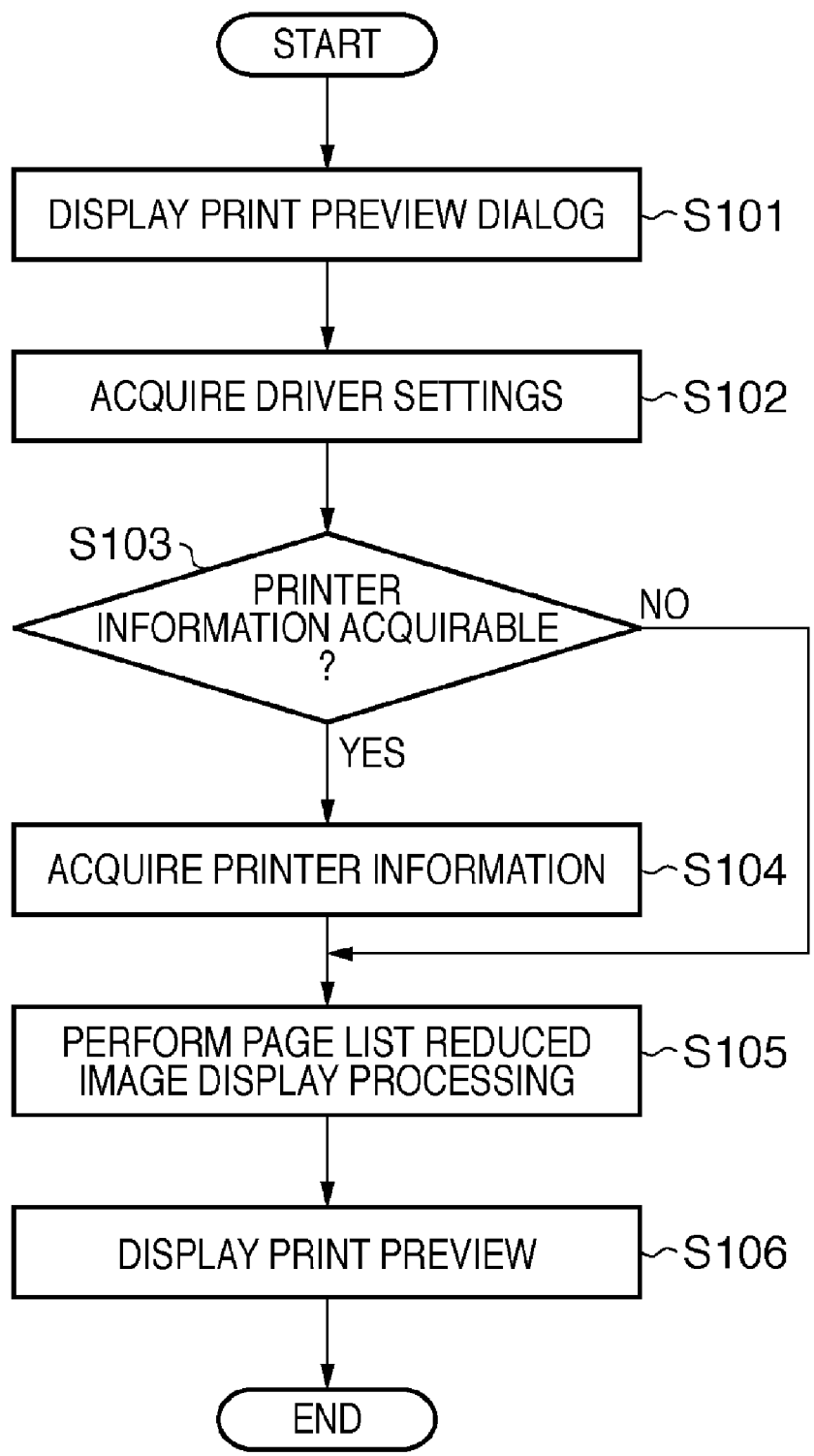
FIG. 8 is a flowchart showing an outline of the operation of a preview system according to the first embodiment of the present invention.

FIG. 8 is a flowchart for explaining an outline of preview processing.

Assume that a reduced image is displayed in the vertical direction, and the user interface shown in FIG. 6 is used. When displaying a reduced image in the horizontal direction, the user interface shown in FIG. 7 is used.

In step S101, a print preview dialog 501 is displayed. In step S102, printer driver settings are acquired from a user interface 206. Acquired paper source information is set in a paper source list box 505. Assume that "roll paper" is set.

It is inquired of a printer information acquisition unit 209 in step S103 whether or not printer information can be acquired from the printer main body.

If acquirable, printer information such as roll paper width information is acquired in step S104. If it is determined not to be able to acquire information from the printer main body, roll paper width information set in a "roll paper width" list box 404 in the printer driver setting information acquired in step S102 is used.

Based on the acquired printer information, the current printer status is displayed in a printer information display text box 507. Roll paper width information acquired from the printer main body or roll paper width information in the printer driver setting information is set in a roll paper width list box 506. Assume that "17 inches" is set.

In step S105, page list reduced image display processing is performed.

Details of this processing will be described later.

After the end of the page list reduced image display processing in step S105, print preview display processing is executed in step S106. By this processing, the paper image 503 which reflects the paper source and roll paper width set in the paper source list box 505 and roll paper width list box 506 is displayed. It is previewed in the paper image 503 how a document containing data 901 and 904 is printed. Then, the process of the system ends.

The page list reduced image display processing in step S105 will be explained.

Figure 9:
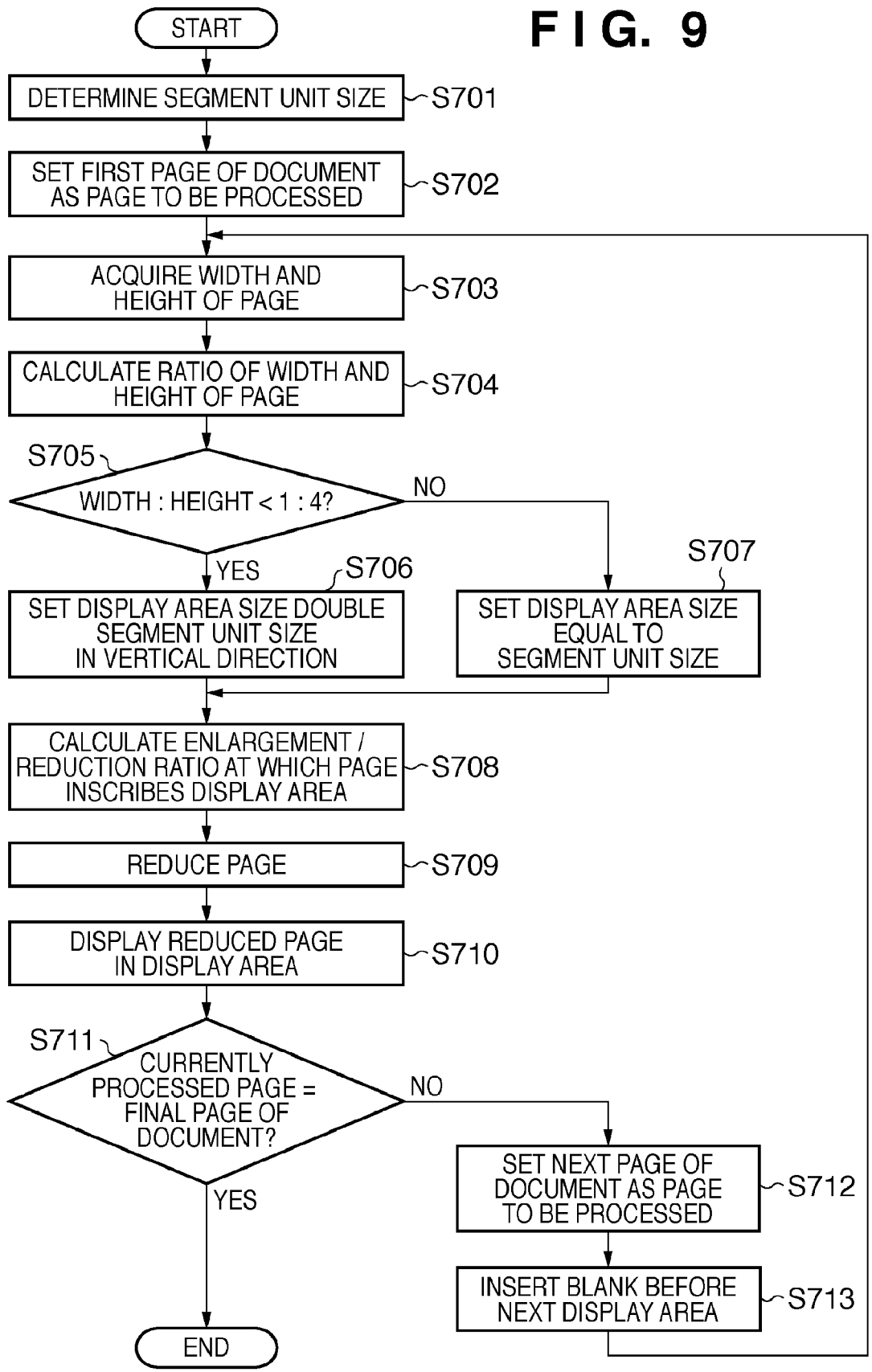
FIG. 9 is a flowchart showing details of page list reduced image display processing.

FIG. 9 is a flowchart showing details of the page list reduced image display processing.

Figure 10:
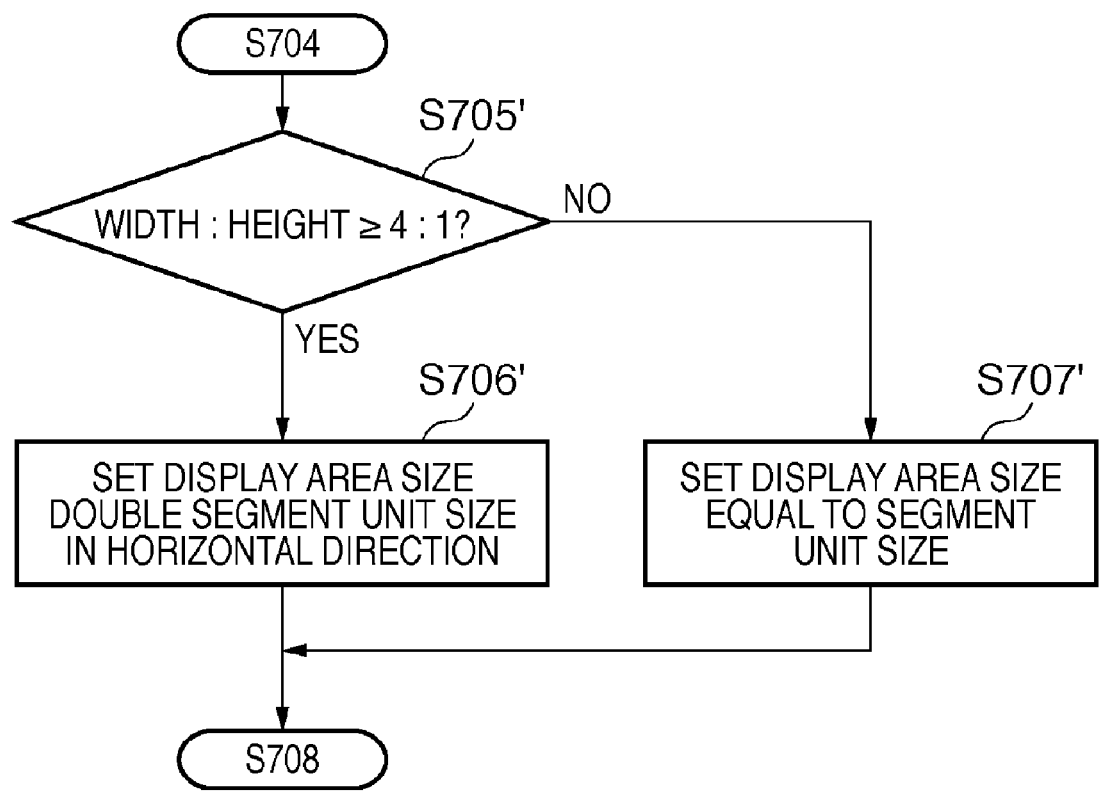
FIG. 10 is a flowchart showing a process to display a reduced image in the horizontal direction in the page list reduced image display processing.

FIG. 10 is a flowchart showing a modification of steps S705 to S707 in FIG. 9.

Figure 11:
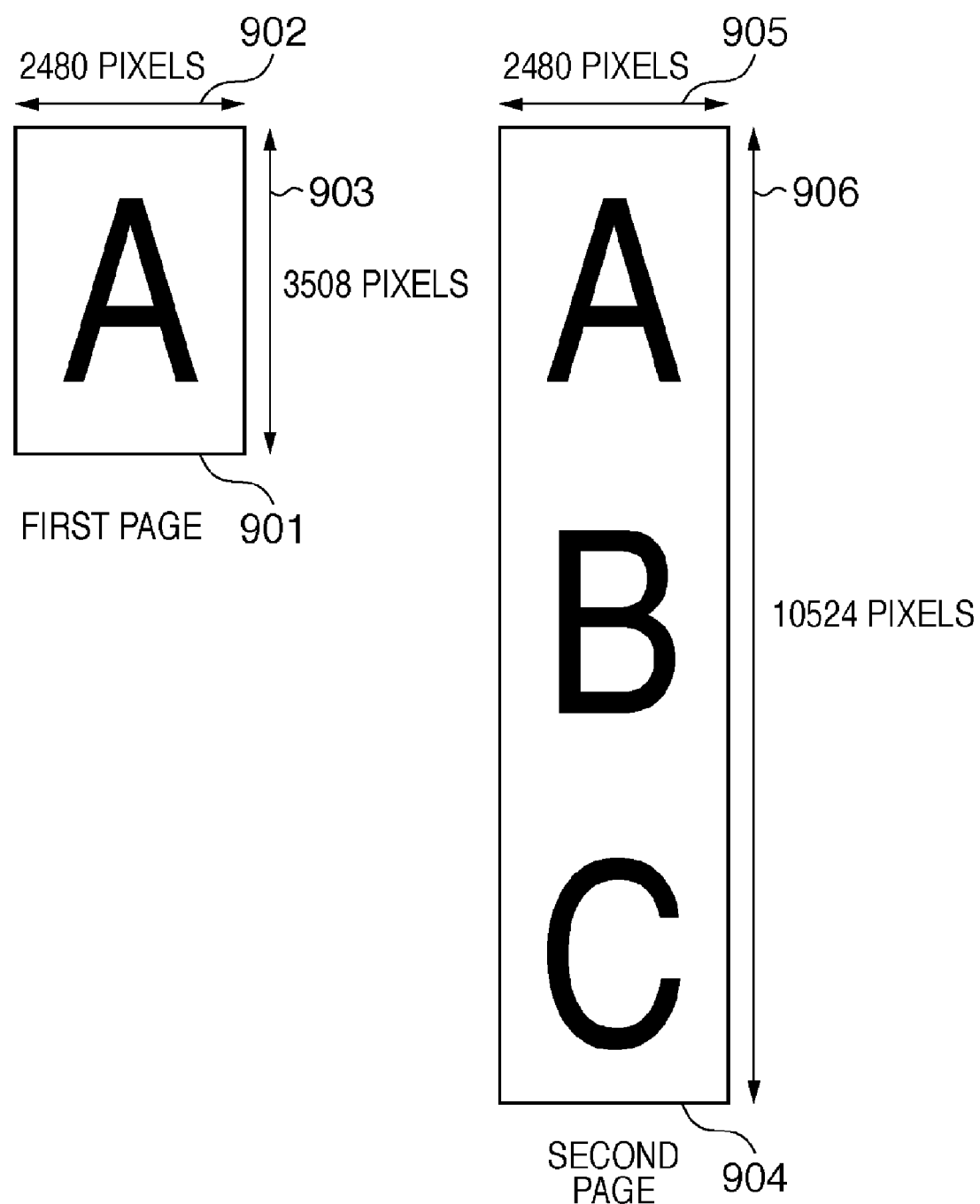
FIG. 11 is a view showing an example of a document input to a print preview control unit in the first embodiment of the present invention.

FIG. 11 is a view showing a document transferred to the print preview control unit.

In FIG. 11, reference numeral 901 denotes the first page of the document; 902, a width of the first page; and 903, a height of the first page. Reference numeral 904 denotes the second page of the document; 905, a width of the second page; and 906, a height of the second page.

Figure 12:
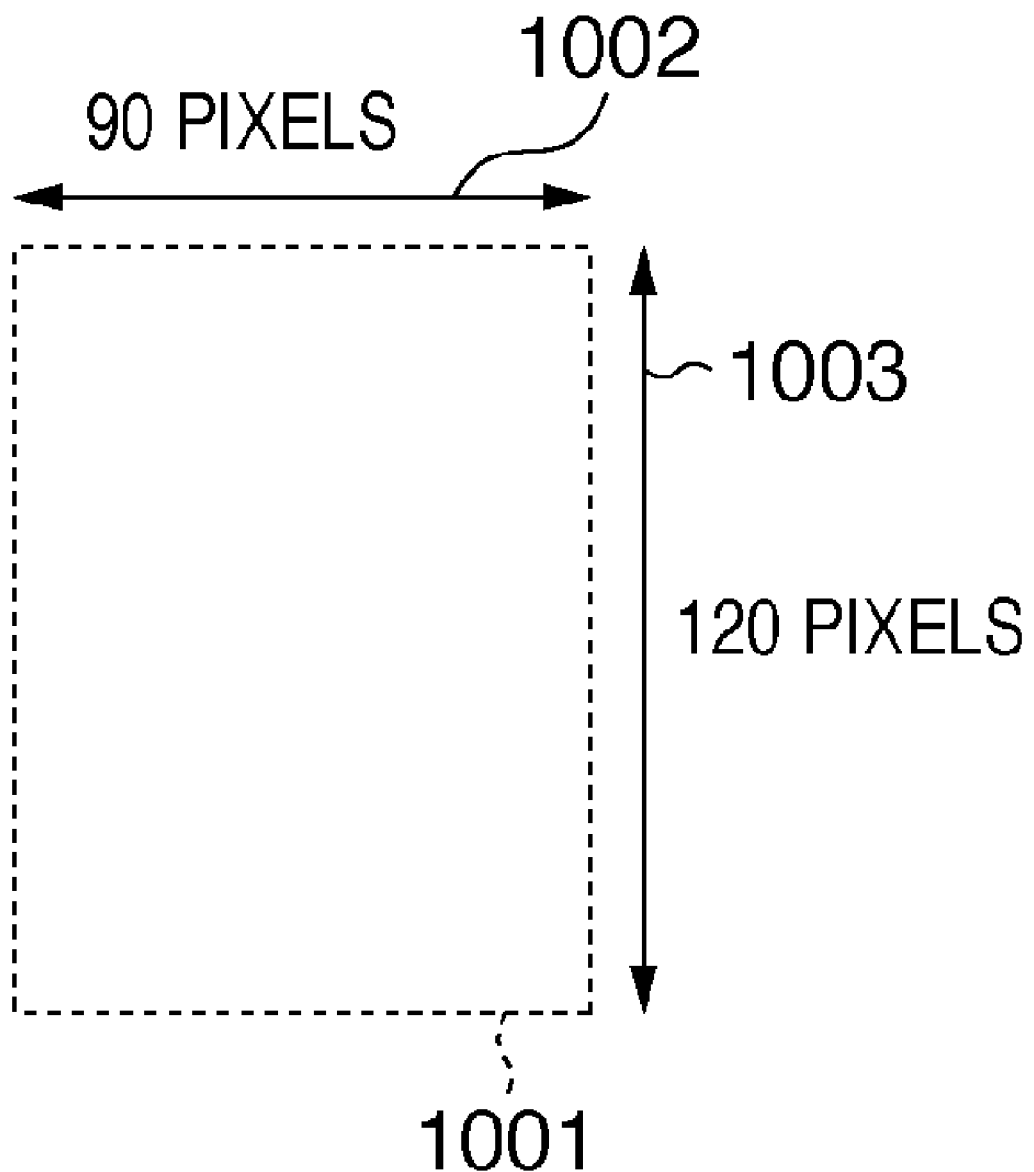
FIG. 12 is a view showing an example of the segment unit size.

FIG. 12 is a view showing the size of a segment unit.

As shown in FIG. 12, according to the first embodiment, a segment unit size serving as the unit of a display area size can be set from a user interface. In FIG. 12, a width 1002 of a segment unit size 1001 is 90 pixels, and a height 1003 of the segment unit size is 120 pixels.

Details of the page list reduced image display processing will be explained with reference to flowcharts shown in FIGS. 9 and 10.

In step S701, the segment unit size is determined. In this case, the segment unit size is set to one shown in FIG. 12.

In step S702, the first page of the document is set as a page to be processed. In this case, the first page 901 is set as a page to be processed.

In step S703, the width and height of the page are acquired. In this case, the width 902 and height 903 of the page 901 to be processed are acquired. The width is 2,480 pixels, and the height is 3,508 pixels.

In step S704, the ratio of the width and height of the page is calculated. In this case, the ratio of the width and height of the page is 2480:3508.

In step S705, a display area size having a display region which is an integer multiple of the segment unit size is calculated from the calculated ratio of the width and height of the page. Since the value of the ratio of the width and height of the page is not less than 1/4, the process advances to step S707, and the display area size is set equal to the segment unit size.

When displaying a reduced image horizontally, the processes in steps S705 to S707 are replaced with those in the flowchart shown in FIG. 10.

More specifically, in step S705', a display area size having a display region which is an integer multiple of the segment unit size is calculated. In this case, the multiple is calculated depending on whether the value of the ratio of the width and height of the page is equal to or greater than 4/1. If the value of the ratio of the width and height of the page is equal to or greater than 4/1, the process advances to step S706' to set the display area size double the segment unit size in the horizontal direction. After that, the process advances to step S708. If the value of the ratio of the width and height of the page is less than 4/1, the process advances to step S707' to set the display area size equal to the segment unit size. Then, the process advances to step S708.

In step S708, the enlargement/reduction ratio at which the page inscribes the display area is calculated. The enlargement/reduction ratio at which a page having a width of 2,480 pixels and a height of 3,508 pixels inscribes a display area having a width of 90 pixels and a height of 120 pixels is calculated to be 3.42%. In step S709, the page 901 is reduced at the calculated enlargement/reduction ratio of 3.42%. In step S710, the reduced page is displayed in the display area.

Figure 13:
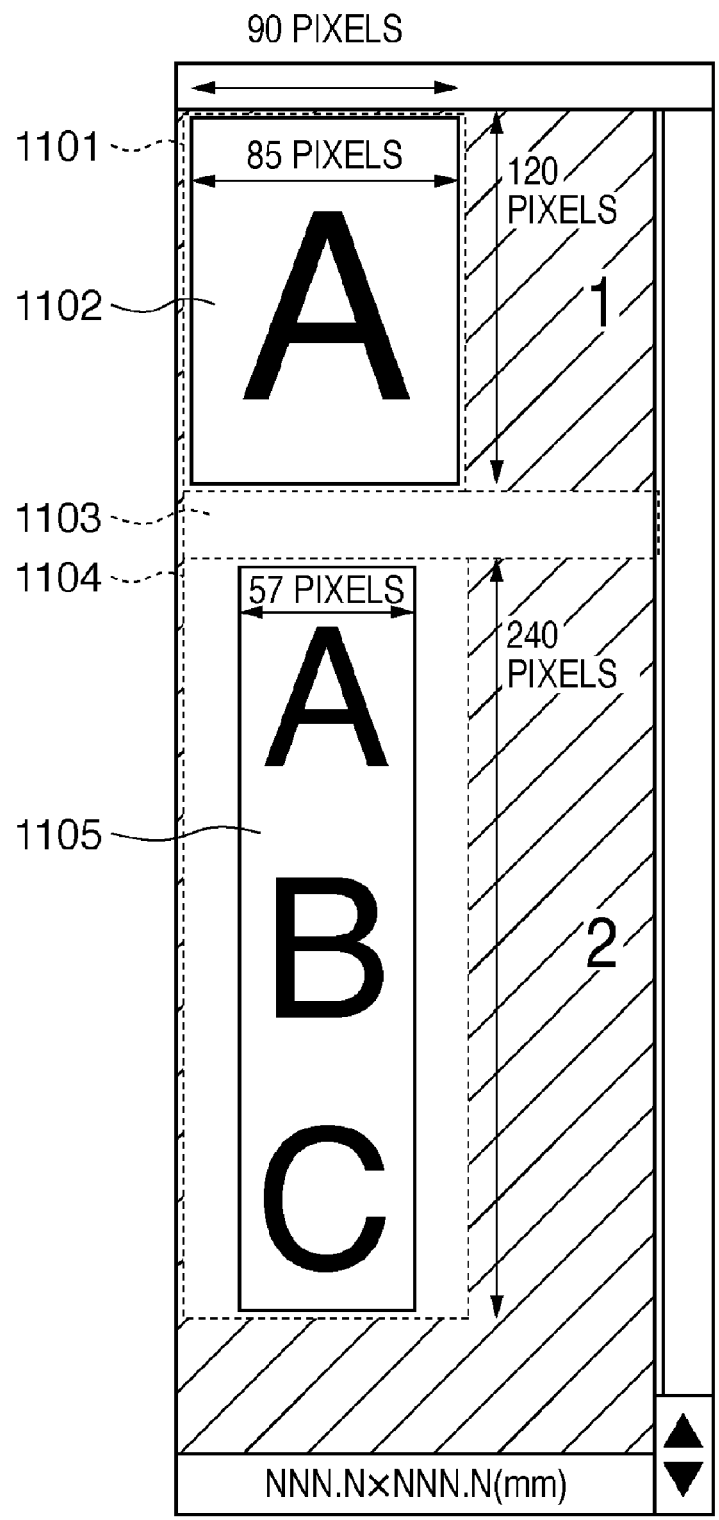
FIG. 13 is a view showing an example of a reduced image display portion which displays the reduced image of a page in the first embodiment of the present invention.

FIG. 13 shows a reduced image display portion 509 which displays the reduced image of a page.

In FIG. 13, reference numeral 1101 denotes a display area of the first page document. The display area 1101 displays a reduced image 1102 of the first page document.

Thereafter, the process advances to step S711 to determine whether or not the currently processed page is the final one. Since the second page 904 follows the first page, the process advances to step S712 to set the next second page 904 of the document as a page to be processed. In step S713, a blank is inserted before the next display area. In this case, a 20-pixel blank 1103 is inserted in the vertical direction below the first page document display area 1101.

Then, the process returns again to step S703 to acquire the width and height of the second page 904 to be processed. In step S704, the ratio of the width and height of the page is calculated. In step S705, a display area size having a display region which is an integer multiple of the segment unit size is calculated from the calculated ratio of the width and height of the page. Since the ratio of the width and height of the page is 2480:10524, and the value of the ratio is less than 1/4, the process advances to step S706. From the result of calculating the value of the ratio of the width and height of the page, the display area size becomes 90 pixels in width and 240 pixels in height, that is, double the segment unit size in the vertical direction.

In FIG. 13, reference numeral 1104 denotes a display area of the second page 904 that is obtained from the display area size calculation result.

In step S708, the enlargement/reduction ratio at which the page inscribes the display area is calculated to be 2.28%. In step S709, the page 904 is reduced at the calculated enlargement/reduction ratio of 2.28%. In FIG. 13, a reduced page 1105 is displayed in the display area 1104.

The process advances again to step S711 to determine whether or not the currently processed page is the final one. Since the currently processed second page 904 is the final page of the document, the process ends.

By the page list reduced image display processing (step S105) according to the first embodiment, the segment size for displaying the reduced image of a page becomes an integer multiple of the segment unit size on the basis of the ratio of the width and height of the page. Even when displaying the reduced image of a longitudinally long-sized page, visual perceptibility is not spoiled.

Note that a "page" sometimes means an image file itself, and this meaning also applies to the following embodiments.

Figure 14:
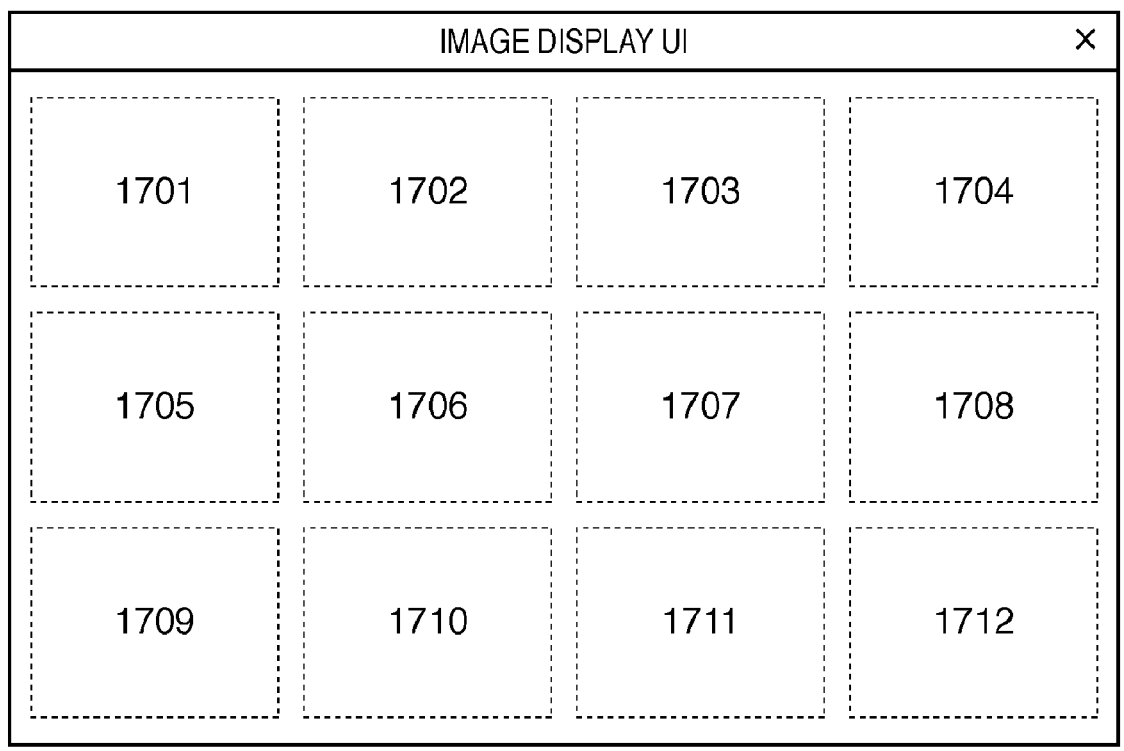
FIG. 14 is a view showing an example of a blank between images in the reduced image display.

When displaying a list of reduced images, the list is generally displayed with blanks of the same width between reduced images in order to improve visual perceptibility, as shown in FIG. 14. When all the display area sizes of reduced images are equal to each other, the same blank width can be set by setting in advance coordinates at which each reduced image is displayed.

However, for a printer using roll paper as a printing medium, as shown in FIGS. 3 and 4, the length of one page is variable. The reduced image display portion displays both a reduced image of a display area size equal to the segment unit size and a reduced image of a display area size which is an integer multiple of the segment unit size.

Figure 15:
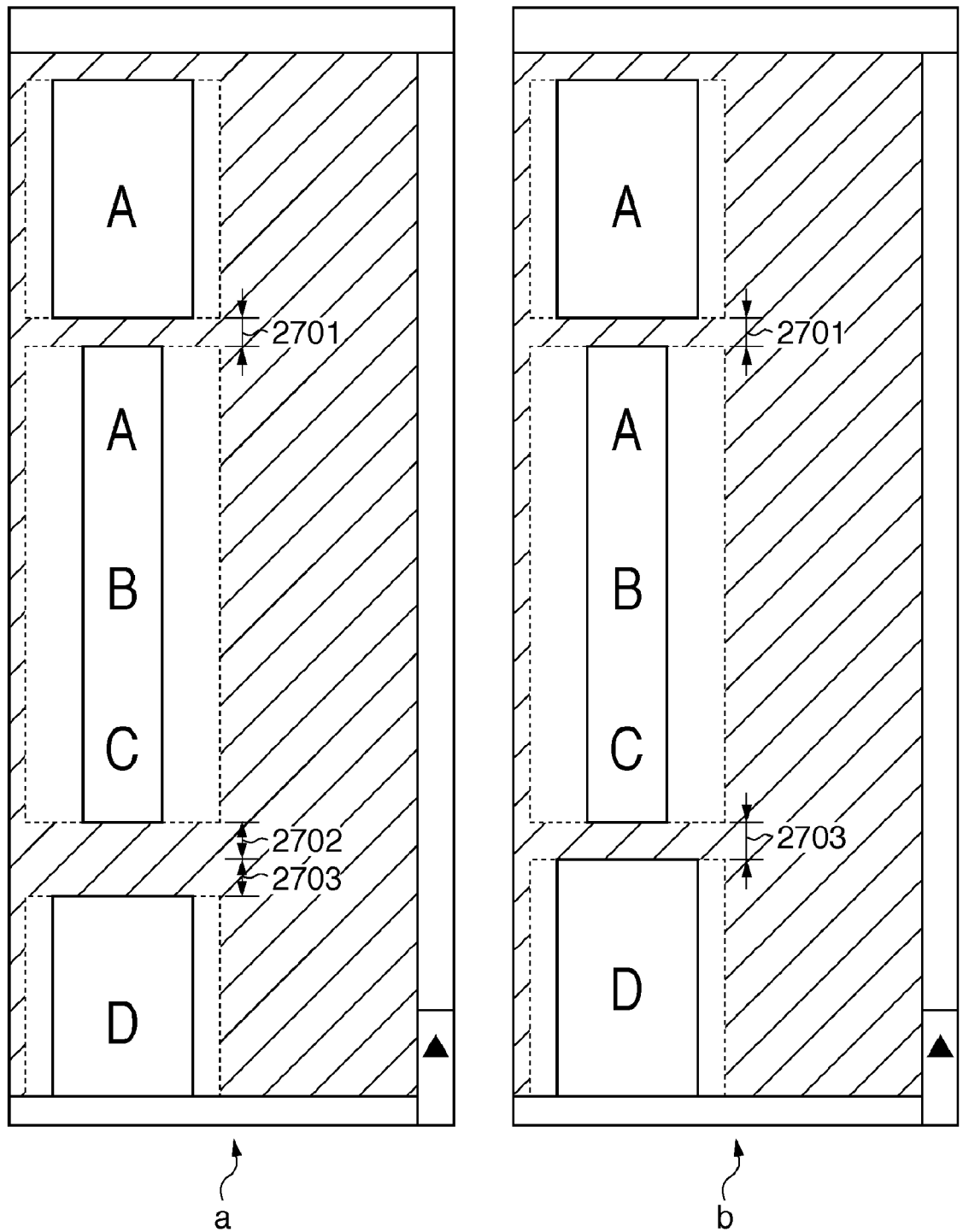
FIG. 15 is a view showing a display example at the reduced image display portion in the first embodiment of the present invention.

FIG. 15 is a view showing a display example at the reduced image display portion.

FIG. 15 shows a comparative example a in which reduced images are displayed at fixed coordinate positions.

In FIG. 15, reference numerals 2701, 2702, and 2703 denote blanks having the same number of pixels. As represented by a of FIG. 15, the blank 2702 having pixels an (integer multiple—1) times as large as that of the segment unit size (one in this case) is added after a reduced image corresponding to a display area size which is an integer multiple (two in this case) of the segment unit size. As a result, the blank widths between reduced images differ from each other, degrading visual perceptibility.

To the contrary, the reduced image display portion according to the first embodiment does not display a list using fixed coordinates. Instead, after the display area size is determined, a blank is intentionally inserted (step S713). Hence, as represented by b of FIG. 15, even when a segment unit size and a display area size which is an integer multiple of the segment unit size coexist, a list is displayed with the same blank width. This improves the visual perceptibility of a reduced image.

A second embodiment will describe an operation of switching the direction in which the reduced image of a document is displayed when displaying the reduced image according to the first embodiment.

A description of an arrangement common to that described in the first embodiment will not be repeated.

According to the flowchart shown in FIG. 8, the print preview dialog is displayed in step S101.

Figure 16:
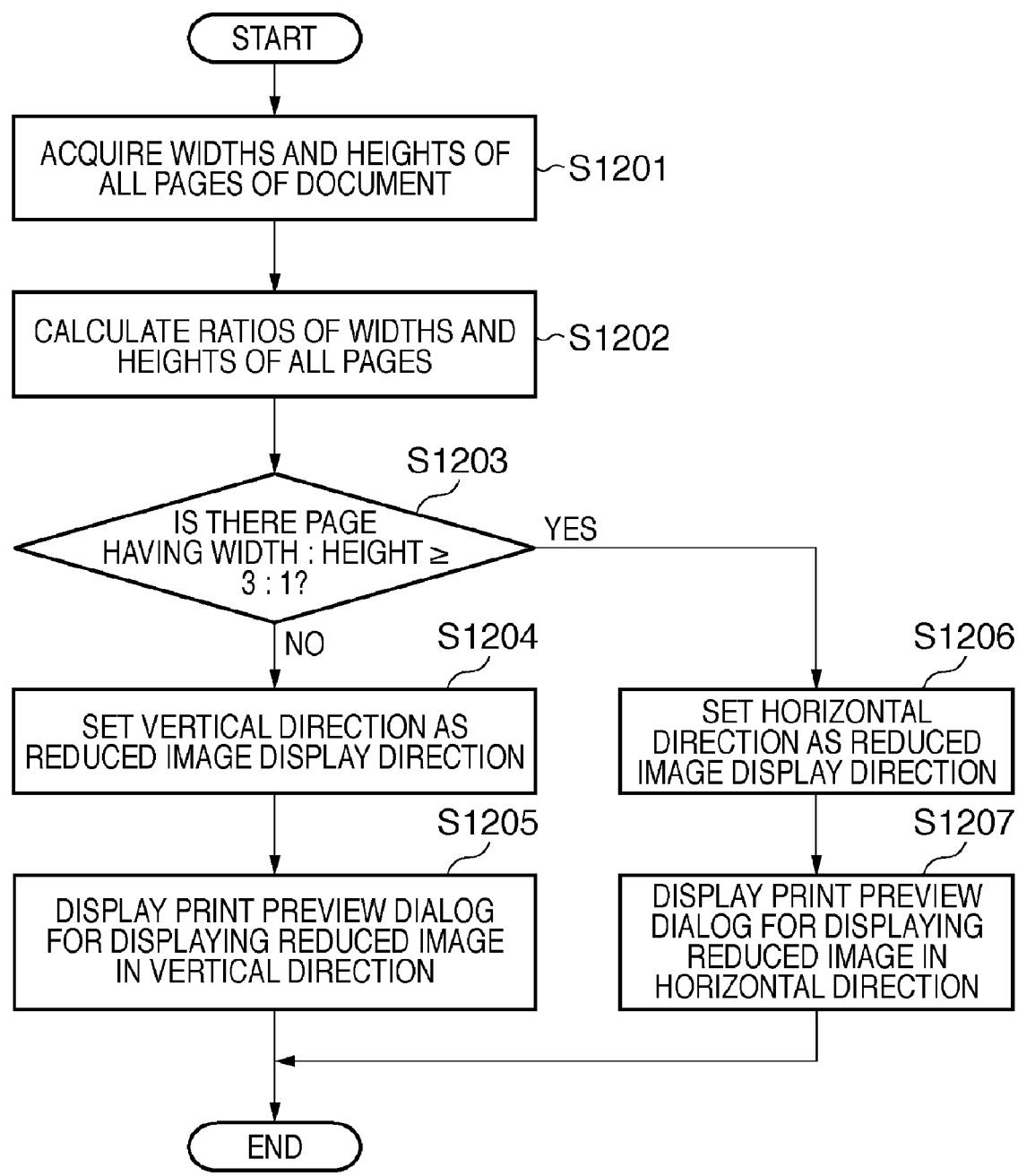
FIG. 16 is a flowchart showing print preview dialog display processing according to the second embodiment of the present invention.

FIG. 16 is a flowchart showing details of print preview dialog display processing according to the second embodiment.

In the second embodiment, the print preview dialog is displayed in accordance with the processing of the flowchart shown in FIG. 16.

In step S1201, the widths and heights of all pages of a document are acquired. In step S1202, the values of the ratios of the widths and heights of all the pages are calculated. In step S1203, it is checked whether there is a page, the value of the ratio of the width and height of which is equal to or greater than 3/1.

If there is no page, the value of the ratio of the width and height of which is equal to or greater than 3/1, the process advances to step S1204 to set the vertical direction as the reduced image display direction. In step S1205, a print preview dialog 501 for displaying a reduced image in the vertical direction is displayed.

If there is a page, the value of the ratio of the width and height of which is equal to or greater than 3/1, the process advances to step S1206 to set the horizontal direction as the reduced image display direction. In step S1207, a print preview dialog 601 for displaying a reduced image in the horizontal direction is displayed.

Thereafter, steps S102 to S104 shown in FIG. 8 are executed.

Then, page list reduced image display processing is performed in step S105.

When the vertical direction is set as the reduced image display direction, the reduced image display processing is executed based on the flowchart shown in FIG. 9. In the other hand, when the horizontal direction is set as the reduced image display direction, the reduced image display processing is executed based on the flowcharts shown in FIGS. 9 and 10. In this case, the processes in steps S705 to S707 of FIG. 9 are replaced with those in steps S705' to S707'. The processes in FIGS. 9 and 10 are also the same as those in the first embodiment, and a description thereof will not be repeated.

Finally, after the print preview is displayed in step S106, the process ends. Step S106 is also the same as that in the first embodiment, and a description thereof will not be repeated.

According to the above-described embodiment, the direction in which the reduced image of a page of a document is displayed can be switched. A reduced image displayed at the reduced image display portion 509 can be displayed with a maximum size in the segment unit or the display area whose size is an integer multiple of the segment unit size in the vertical or horizontal direction.

A third embodiment will describe an operation of rotating and displaying a reduced image when displaying the reduced images of a document formed from pages in different orientations.

Figure 17A:
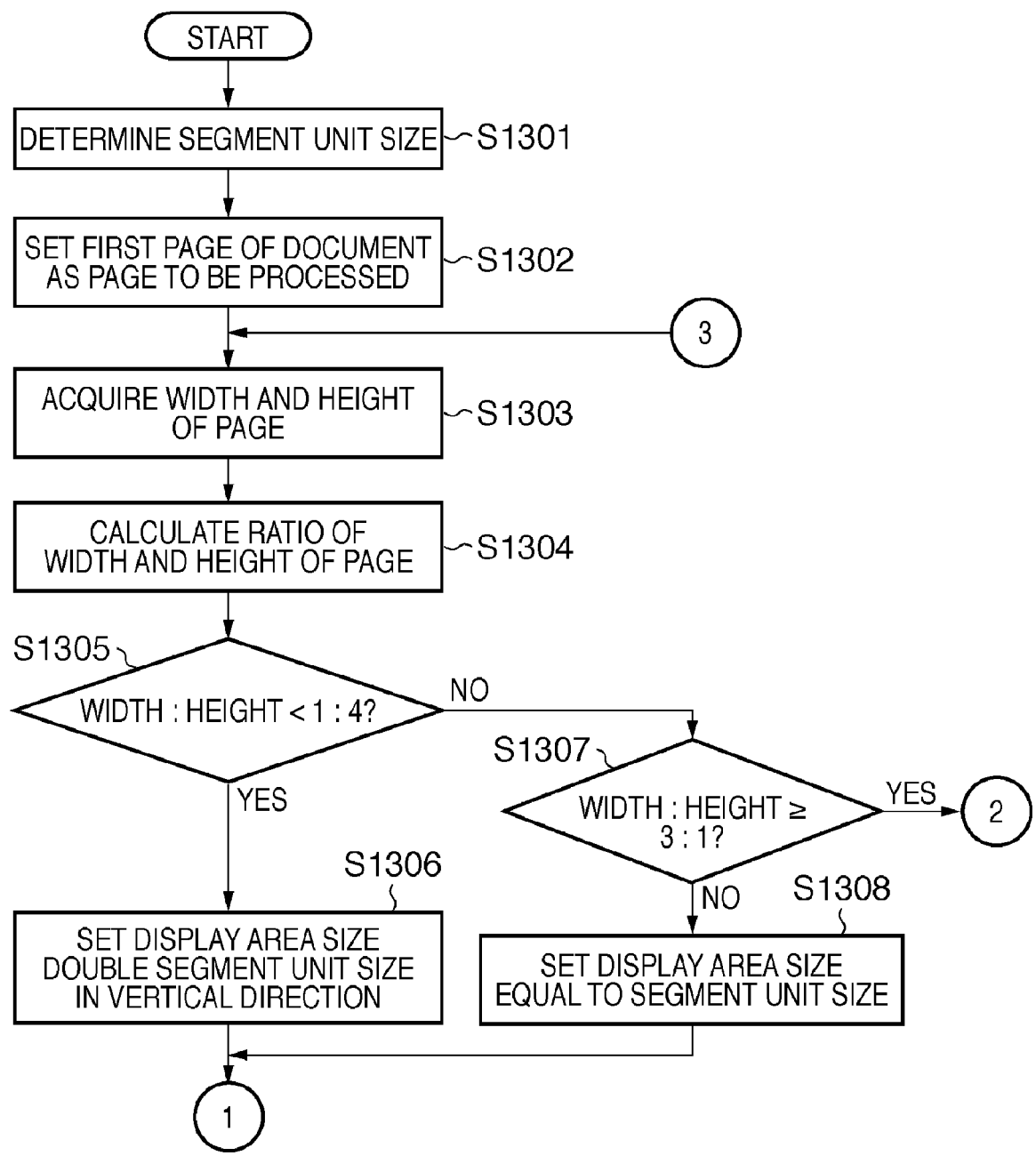
FIGS. 17A and 17B are flowcharts showing page list reduced image display processing according to the third embodiment of the present invention.
Figure 17B:
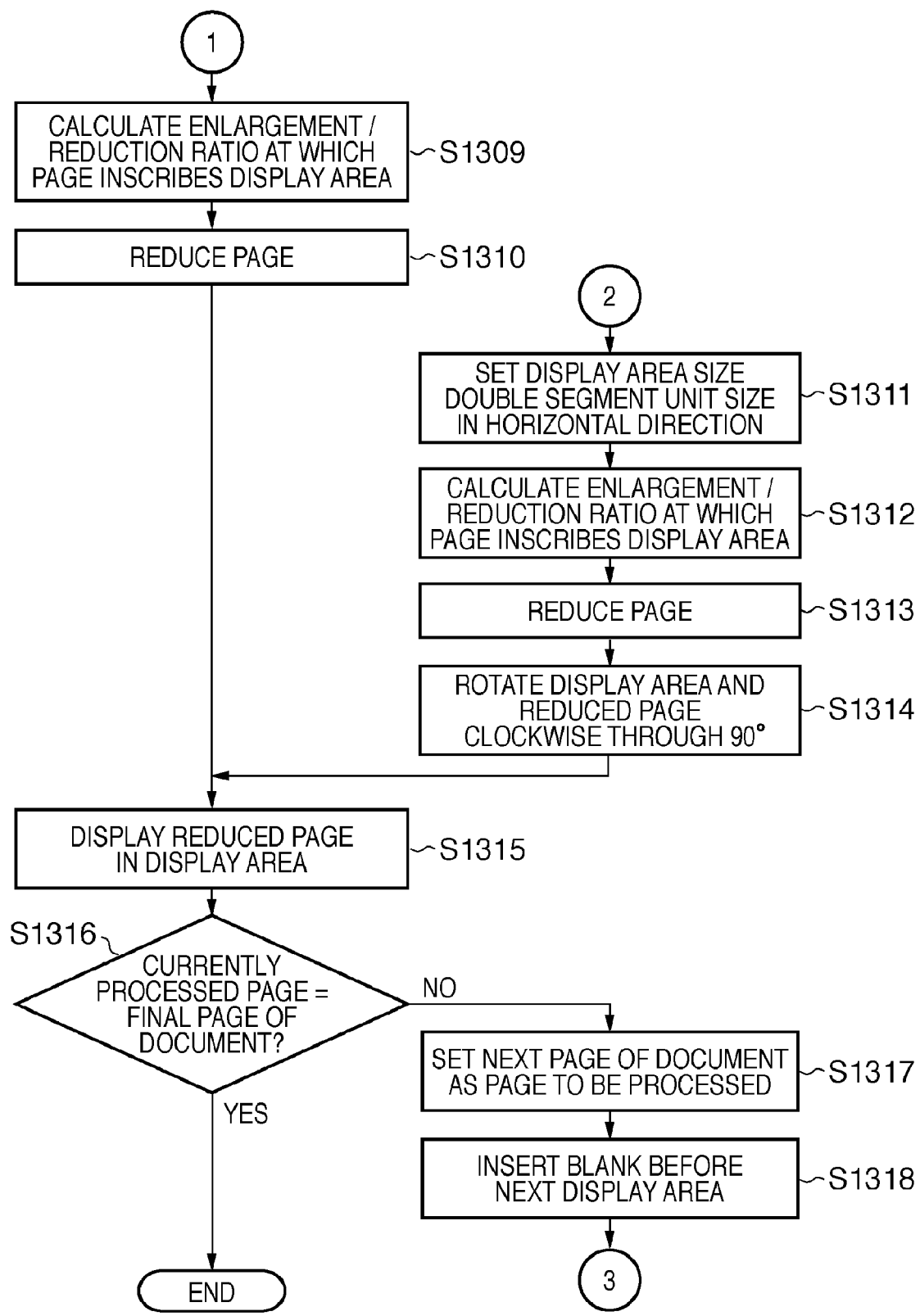

FIGS. 17A and 17B are flowcharts showing details of page list reduced image display processing according to the third embodiment.

Figure 18:
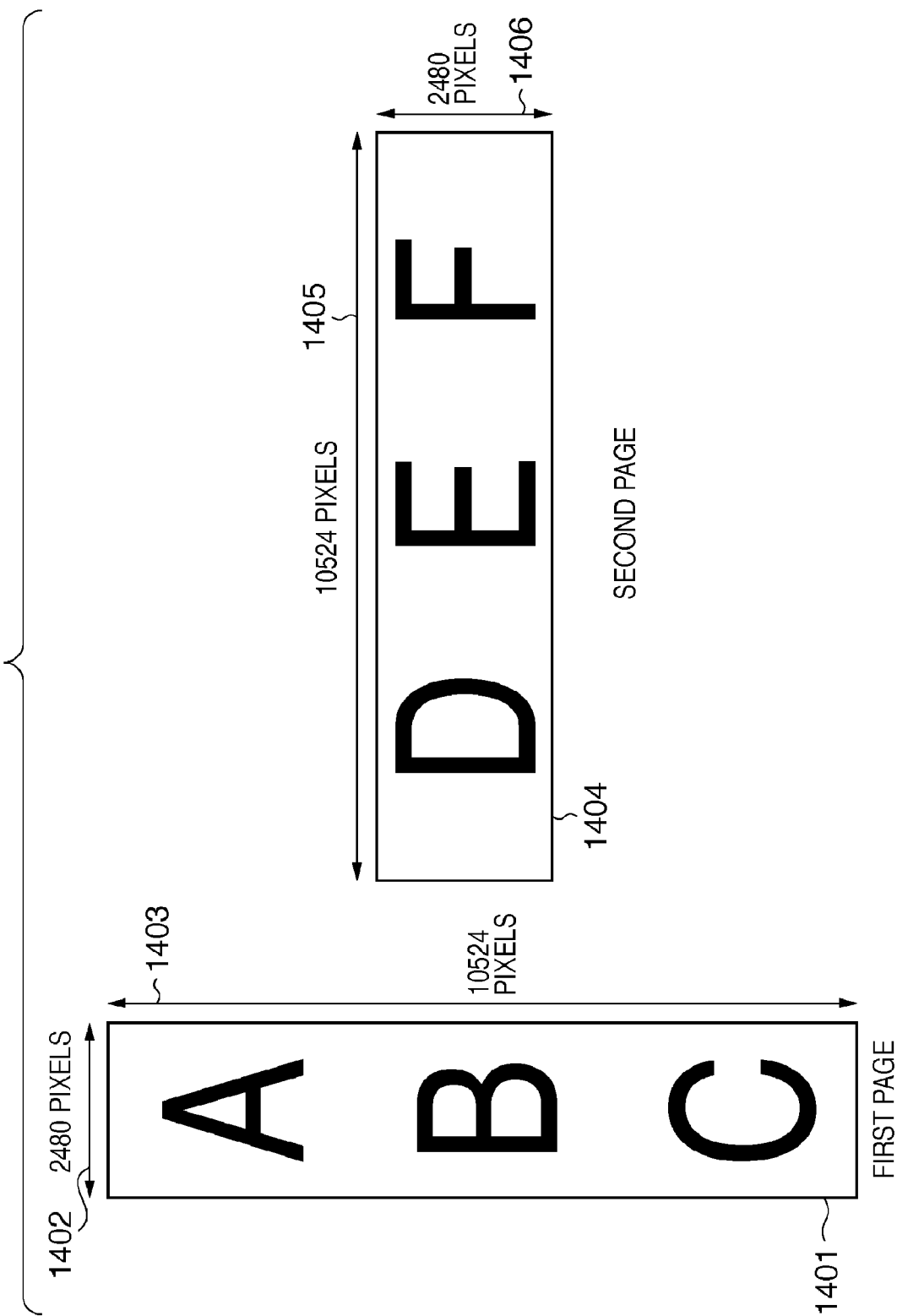
FIG. 18 is a view showing an example of a document transferred to a print preview control unit in the third embodiment of the present invention.

FIG. 18 is a view showing a document transferred to a print preview control unit 208 according to the third embodiment.

In FIG. 18, reference numeral 1401 denotes the first page of the document; 1402, a width of the first page; and 1403, a height of the first page. Reference numeral 1404 denotes the second page of the document; 1405, a width of the second page; and 1406, a height of the second page.

Figure 19:
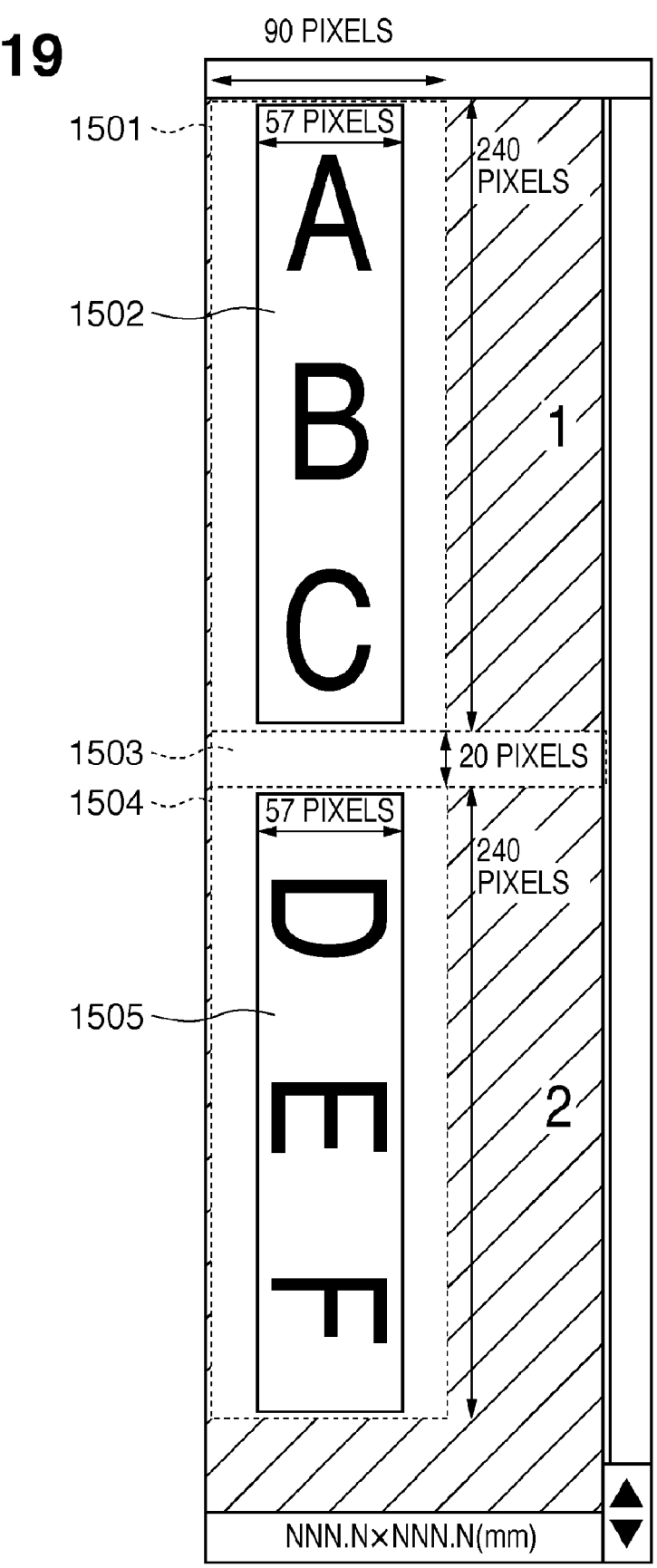
FIG. 19 is a view showing an example of a reduced image display portion which displays the reduced image of a page in the third embodiment of the present invention.

FIG. 19 shows a reduced image display portion which displays the reduced image of pages according to the third embodiment.

In FIG. 19, reference numeral 1501 denotes a display area of the first page of the document; and 1502, a reduced image of the first page of the document. Reference numeral 1503 denotes a blank inserted between the display areas of the first and second pages; 1504, a display area of the second page of the document; and 1505, a reduced image of the second page of the document.

Figure 20:
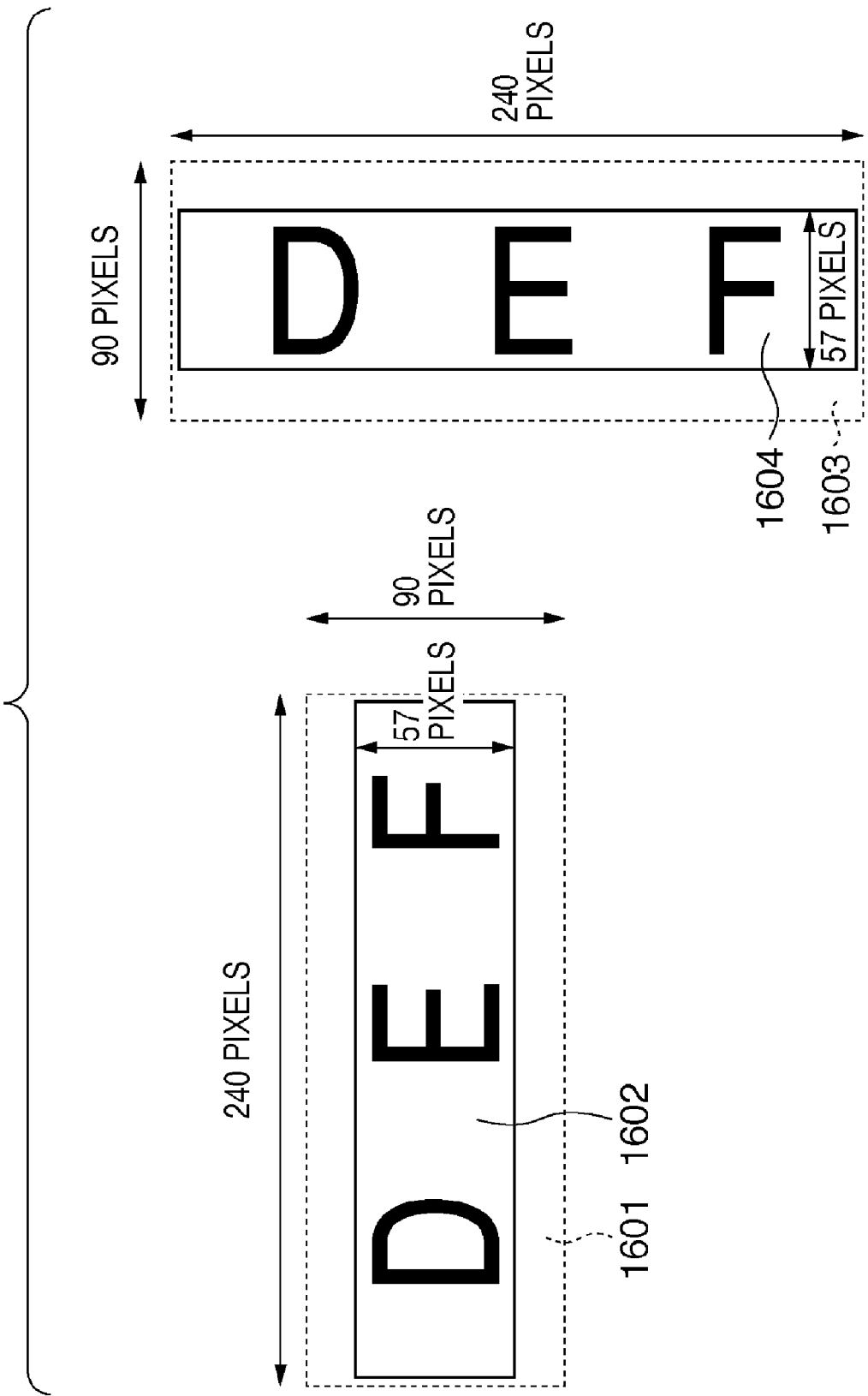
FIG. 20 is a view for explaining an operation when rotating a reduced image in the third embodiment of the present invention.

FIG. 20 is a view showing an operation of rotating and displaying a reduced image according to the third embodiment.

In FIG. 20, reference numeral 1601 denotes a display area before rotation; 1602, a reduced image before rotation; 1603, a display area after rotation; and 1604, a reduced image after rotation.

A description of an arrangement common to that described in the first embodiment will not be repeated.

Steps S101 to S104 and S106 shown in the flowchart of FIG. 8 are also executed in the third embodiment. However, these steps are the same as those in the first embodiment, and a description thereof will not be repeated.

In FIG. 8, page list reduced image display processing is performed in step S105, which will be described with reference to FIGS. 17A and 17B.

In step S1301, the segment unit size is determined. In this case, the segment unit shown in FIG. 12 is used similarly to the first embodiment. A width 1002 of the segment unit size is 90 pixels, and a height 1003 of the segment unit size is 120 pixels.

In step S1302, the first page 1401 of a document is set as a page to be processed. In step S1303, the width and height of the page are acquired. In this case, the width 1402 and height 1403 of the page 1401 to be processed are acquired. The width is 2,480 pixels, and the height is 10,524 pixels.

In step S1304, the ratio of the width and height of the page is calculated. In this case, the ratio of the width and height of the page is 2480:10524.

In step S1305, a display area size having a display region which is an integer multiple of the segment unit size is calculated from the calculated ratio of the width and height of the page. Since the ratio of the width and height of the page is 2480:10524 and the value of the ratio is less than 1/4, the process advances to step S1306 to set the display area size double the segment unit size in the vertical direction. In FIG. 19, reference numeral 1501 denotes a first page display area obtained by this calculation. The width and height of the display area 1501 are 90 pixels and 240 pixels, respectively.

In step S1309, the enlargement/reduction ratio at which the page inscribes the display area is calculated. The enlargement/reduction ratio at which a page having a width of 2,480 pixels and a height of 10,524 pixels inscribes a display area having a width of 90 pixels and a height of 240 pixels is 2.28%. In step S1310, the first page 1401 is reduced at the calculated enlargement/reduction ratio of 2.28%. In step S1315, the reduced page is displayed in the display area. As a result, the reduced image 1502 of the first page of the document is displayed in the first page document display area 1501 shown in FIG. 19.

The process advances to step S1316 to determine whether or not the currently processed page is the final one. Since the second page 1404 follows the first page, the process advances to step S1317 to set the next second page 1404 of the document as a page to be processed. In step S1318, a blank is inserted before the next display area. In this case, a 20-pixel blank 1503 is inserted in the vertical direction below the first page document display area 1501.

Then, the process returns again to step S1303 to acquire the width and height of the second page 1404 to be processed. In step S1304, the ratio of the width and height of the page is calculated. In step S1305, a display area size having a display region which is an integer multiple of the segment unit size is calculated from the calculated ratio of the width and height of the page. Since the ratio of the width and height of the page is 10524:2480 and the value of the ratio is not less than 1/4, the process advances to step S1307. In step S1307, the display area size is further calculated depending on whether or not the value of the ratio of the width and height is equal to or higher than 3/1.

Since the value of the ratio is equal to or greater than 3/1, the process advances to step S1311 to set the display area size double the segment unit size in the horizontal direction. On the other hand, if the value of the ratio of the width and height is less than 3/1, the process advances to step S1308 to set the display area size equal to the segment unit size. In FIG. 20, reference numeral 1601 denotes a display area obtained by this calculation for the second page 1404. The width and height of the display area 1601 are 240 pixels and 90 pixels, respectively.

In step S1312, the enlargement/reduction ratio at which the page inscribes the display area is calculated to be 2.28%. In step S1313, the second page 1404 is reduced at the calculated enlargement/reduction ratio of 2.28%. In FIG. 20, reference numeral 1602 denotes the reduced image. In step S1314, the display area 1601 and reduced page 1602 are rotated clockwise through 90°. In FIG. 20, reference numeral 1603 denotes a display area after rotation; and 1604, a reduced page after rotation.

The process advances to step S1315 to display the reduced page in the display area. In FIG. 19, reference numerals 1504 and 1505 denote the display area and reduced image of the second page displayed at the reduced image display portion 509.

Finally, in step S1316, it is determined whether or not the currently processed page is the final one. Since the currently processed second page 1404 is the final page of the document, the process ends.

According to the flowchart shown in FIG. 8, after these processes, print preview display processing is executed in step S106, and the process ends. As described above, the process in step S106 is the same as that in the first embodiment, and a description thereof will not be repeated.

According to the above-described embodiment, a display area and reduced page can be rotated and displayed. Even when displaying the reduced images of a document containing both portrait and landscape pages, the third embodiment can solve the problem that page contents are not visually perceptible from the excessively reduced image of either page.

A fourth embodiment will exemplify a case where blanks are properly set between a plurality of reduced images displayed on the display screen.

As shown in FIG. 14 referred to in the first embodiment, a plurality of reduced images are displayed on the display screen with blanks between them. As shown in FIG. 14, blanks are generally set to arrange, at equal intervals, a plurality of segment units 1701 to 1712 for displaying a plurality of reduced images.

Figure 21:
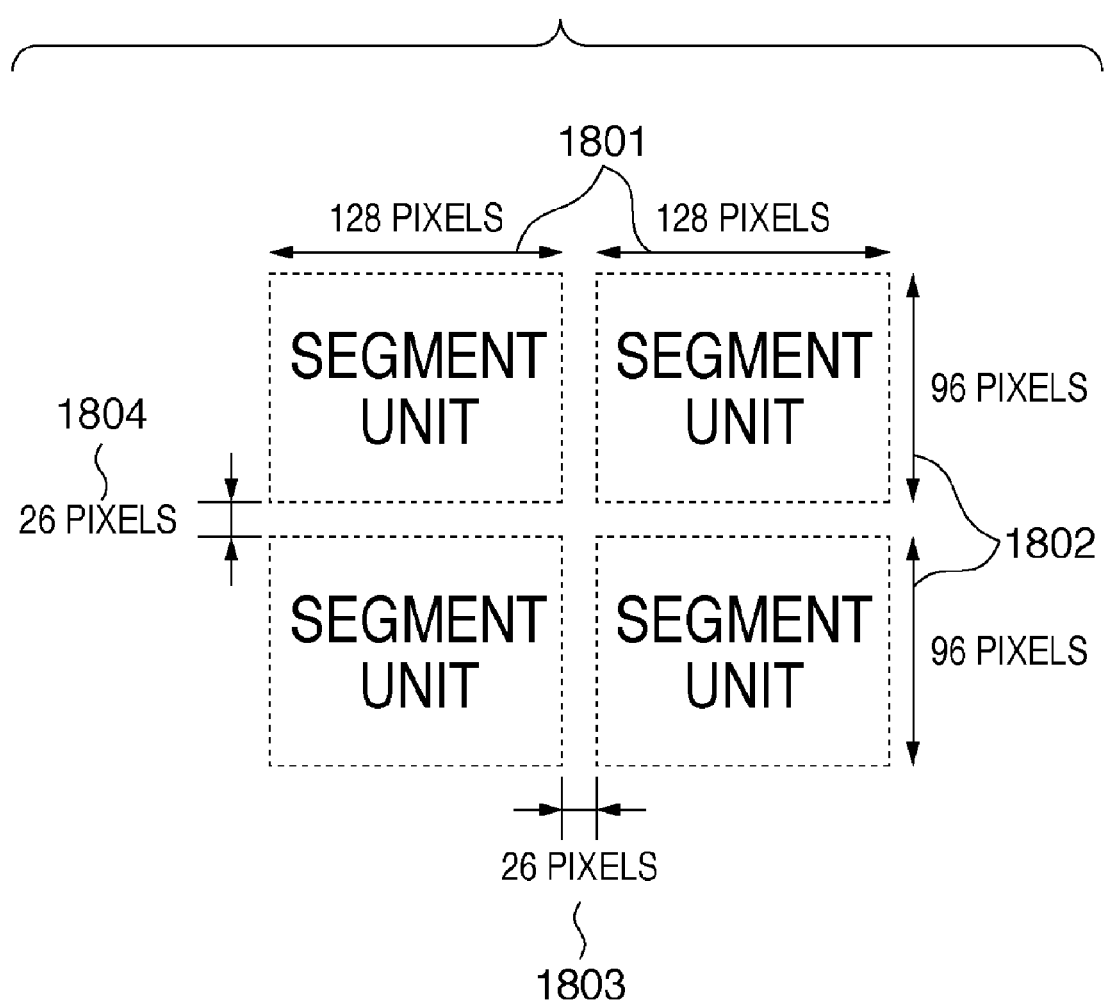
FIG. 21 is a view showing an example of the segment unit size according to the fourth embodiment of the present invention.

FIG. 21 is a view showing a segment unit size used in the fourth embodiment. The segment units 1701 to 1712 shown in FIG. 14 are arranged at equal intervals.

In FIG. 21, reference numeral 1801 denotes a width of the segment unit; 1802, a height of the segment unit; 1803, a horizontal interval between segment units; and 1804, a vertical interval between segment units. The horizontal and vertical intervals 1803 and 1804 serve as blanks between segment units.

FIG. 22 is a view showing an example of an image file used for printing by a printing system.

In FIG. 22, reference numerals 1901 to 1906 denote image files displayed together with their images and image sizes. Assume that these image files are processed sequentially from the image files 1901 to 1906.

FIG. 23 is a view showing a user interface which displays the reduced images of the image files shown in FIG. 22.

Reduced image display processing according to the fourth embodiment when previewing image files as shown in FIG. 22 will be explained with reference to a flowchart.

Figure 24A:
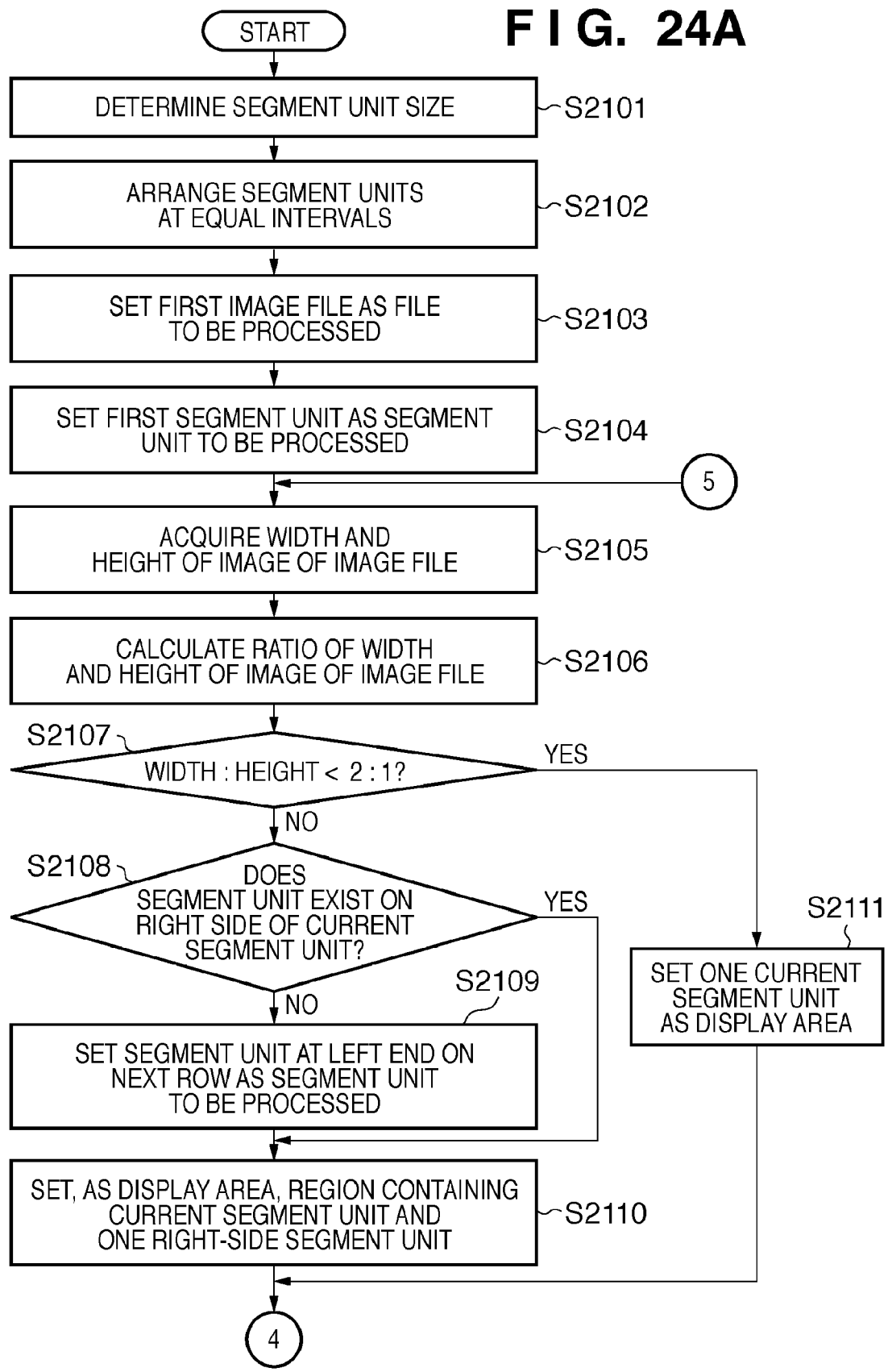
FIGS. 24A and 24B are flowcharts showing details of reduced image display processing for image data according to the fourth embodiment of the present invention.
Figure 24B:
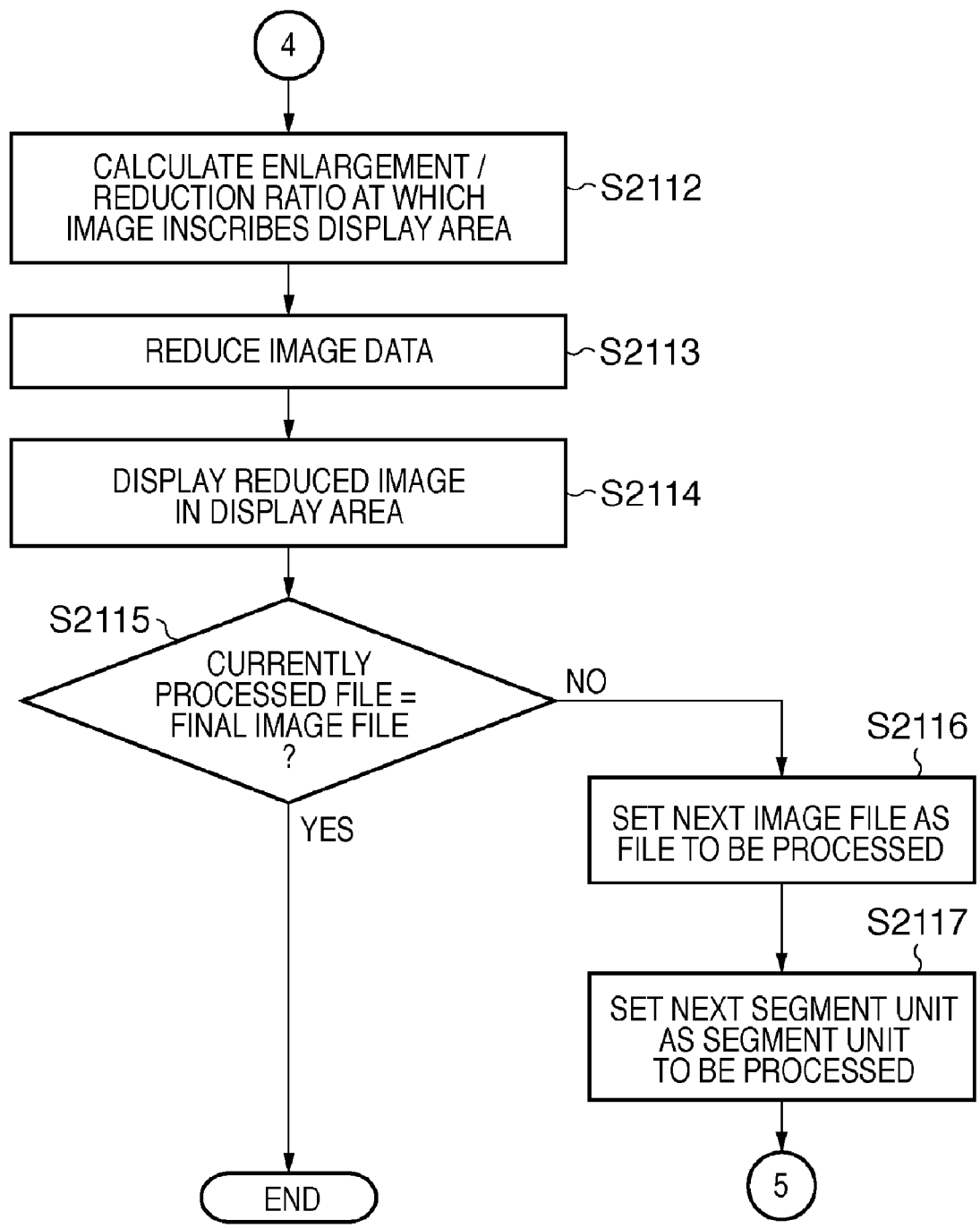

FIGS. 24A and 24B are flowcharts showing details of the reduced image display processing according to the fourth embodiment.

In step S2101, the segment unit size is determined. In this case, the width 1801 of the segment unit is 128 pixels, and the height 1802 of the segment unit is 96 pixels.

In step S2102, segment units are arranged at equal intervals, as shown in FIG. 14. More specifically, as shown in FIG. 21, the horizontal interval 1803 between segment units is set to 26 pixels, and the vertical interval 1804 between segment units is set to 26 pixels. The segment units 1701 to 1712 are arranged as shown in FIG. 14. In the following description, these segment units are processed sequentially from the segment units 1701 to 1712.

In step S2103, the first image file 1901 is set as a file to be processed. In step S2104, the first segment unit 1701 is set as a segment unit to be processed.

In step S2105, the width and height of image data are acquired. In this case, the width and height of the image in the image file 1901 are acquired. The acquired width of the image data is 640 pixels, and the height is 480 pixels. In step S2106, the ratio of the acquired width and height of the image is calculated. In this case, the ratio of the width and height of the image is 640:480.

In step S2107, it is determined whether or not the value of the calculated ratio is less than a predetermined value. Since the value of the calculated ratio (640:480) is less than 2/1, the process advances to step S2111. In step S2111, one current segment unit is set as a display area. In this case, the segment unit 1701 is set as a display area. In step S2112, the enlargement/reduction ratio at which the image in the image file 1901 inscribes the display area is calculated. In this case, the enlargement/reduction ratio at which the image in the image file 1901 inscribes the display area 1701 is calculated. The size of the display area 1701 is equal to that of the segment unit. The width 1801 and height 1802 of the segment unit are 128 pixels and 96 pixels, respectively. Hence, the enlargement/reduction ratio at which the image in the image file 1901 having a width of 640 pixels and a height of 480 pixels inscribes this display area is 20.0%.

In step S2113, the image data of the image file 1901 is reduced at the enlargement/reduction ratio of 20.0% calculated in step S2112. In step S2114, the reduced image data is displayed in the display area. In this case, the image data reduced in step S2113 is displayed in the segment unit 1701. In FIG. 23, reference numeral 2001 denotes a display area for displaying the reduced image of the image file 1901; and 2002, a displayed reduced image. Likewise, reference numerals 2004, 2006, 2008, 2010 and 2012 respectively denote the reduced images of the image files 1902, 1903, 1904, 1905 and 1906. Reference numerals 2003, 2005, 2007, 2009 and 2011 respectively denote display areas for the reduced images 2004, 2006, 2008, 2010 and 2012.

Further, the process advances to step S2115 to determine whether or not the currently processed file is the final one. Since the image files 1902 to 1906 have not been processed, the process advances to step S2116. In step S2116, the next image file 1902 is set as a file to be processed. In step S2117, the next segment unit 1702 is set as a segment unit to be processed.

Thereafter, the process returns again to step S2105 to acquire the width and height of the image of the next image file. In this case, the width and height of the image of the image file 1902 are acquired. The acquired width of the image is 1,280 pixels, and the height is 480 pixels. In step S2106, the ratio of the acquired width and height of the image data is calculated. In this case, the ratio of the width and height is 1280:480. In step S2107, it is determined whether or not the value of the calculated ratio is less than a predetermined value. Since the value of the calculated ratio (1280:480) is not less than 2/1, the process advances to step S2108.

In step S2108, it is determined whether or not a segment unit exists on the right side of the current segment unit. Since the segment unit 1703 exists on the right side of the current segment unit 1702, the process advances to step S2110. If no segment unit exists on the right side of the current segment unit, the process advances to step S2109 to set a segment unit at the left end on the next row as a segment unit to be processed. Then, the process advances to step S2110.

In step S2110, a region containing the current segment unit and one right-side segment unit is set as a display area. In this case, a region containing the current segment unit 1702 and the right-side segment unit 1703 is set as a display area. The width of this display area is 282 pixels, which is the sum of the width 1801 of the segment unit 1702, the horizontal interval 1803 between segment units, and the width 1801 of the segment unit 1703. The height of this display area is 96 pixels, which is the height 1802 of the segment unit. That is, when horizontally enlarging the segment unit size N times (N: a positive integer), a display area size obtained by adding a width of (N−1)×pixels of a blank is set.

In step S2112, the enlargement/reduction ratio at which the image in the image file inscribes the display area is calculated. In this case, the enlargement/reduction ratio at which the image in the image file 1902 inscribes the display area set in step S2110 is calculated. The enlargement/reduction ratio at which image having a width of 1,280 pixels and a height of 480 pixels inscribes a display area having a width of 282 pixels and a height of 96 pixels is 20.0%.

In step S2113, the image data of the image file 1902 is reduced at the enlargement/reduction ratio of 20.0% calculated in step S2112. In step S2114, the reduced image data is displayed in the display area. In FIG. 23, reference numeral 2003 denotes a display area for displaying the reduced image of the image file 1902; and 2004, a displayed reduced image.

In step S2115, it is determined whether or not the currently processed file is the final one. Since the image files 1903 to 1906 have not been processed, the process advances to step S2116. In step S2116, the next image file 1903 is set as a file to be processed. In step S2117, the next segment unit 1704 is set as a segment unit to be processed.

The reduced images of subsequent image files up to the image file 1906 are similarly displayed. Then, the process ends.

As described above, according to the fourth embodiment, when the value of the ratio of the width and height of image data of each of the image files 1901 to 1906 is less than 2/1, one segment unit is set as a display area. When the value of the ratio is equal to or greater than 2/1, a region containing a current segment unit and one adjacent segment unit is set as a display area. Then, the image in the image file is displayed in the region such that the image inscribes the region. Hence, the reduced image of a panoramic image, like the image files 1902, 1904, and 1906, is displayed in a region where the display area contains one adjacent segment unit.

According to the fourth embodiment, while maintaining the regularity of display areas, reduced images are displayed, improving visual perceptibility.

The fourth embodiment has exemplified a landscape image, the ratio of the height and width of the image of which is 3:4 or 3:8, like the image files 1901 to 1906 shown in FIG. 22. However, the width, height, and orientation may not always be unified.

In this case, a list of pages can be displayed on the reduced image display user interface shown in FIG. 14 according to the methods described in the first to third embodiments. That is, if necessary, an image is rotated. The enlargement/reduction ratio at which the image is fit into a segment unit size or a display area size that is an integer multiple of the segment unit size and considers the blank size is calculated. An image reduced at the calculated enlargement/reduction ratio is displayed.

The host apparatus executes the preview processing in the above-described embodiments, but the present invention is not limited to this. For example, a preview may also be presented using a display such as an LCD, operation keys, and the like which are arranged on the operation panel 12 of the large-format printer shown in FIGS. 3 and 4. In this case, it is assumed that the host apparatus transmits document data and data necessary for preview processing.

The control program of the printing system according to the present invention may also be executed by loading it to a host apparatus (PC), a printing apparatus connected to it, or the like from a storage medium such as a CD-ROM or flexible disk, by e-mail, or via a network such as PC communication. For example, the memory of the printing apparatus or the HDD of the PC can store the program. The CPU of the printing apparatus or PC executes the program, implementing the present invention.

In addition, the form of the inkjet printing apparatus according to the present invention may also be the form of an image output apparatus for an information processing apparatus such as a computer, the form of a copying machine combined with a reader, or the form of a facsimile apparatus having transmission and reception functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-337666, filed Dec. 27, 2007, which is hereby incorporated by reference herein in its entirety.

What is claimed is:

1. A printing system including a host apparatus which generates document data of a document formed from a plurality of pages, and a printing apparatus which receives the document data from the host apparatus and prints an image based on the document data on a printing medium, the system comprising:

segment unit size setting means for setting a segment unit size serving as a unit of a display area for displaying, as images, a list of pages which form the document;

acquisition means for acquiring a width and a height of each page image from the document data;

calculation means for, when a value of a ratio of the width and the height of the page acquired by said acquisition means exceeds a predetermined value, calculating, from the segment unit size, a display area size having a display region larger than the segment unit size;

determination means for determining, for a page having the value of the ratio exceeding the predetermined value, an enlargement/reduction ratio so as to fit the page at the display area size; and display means for displaying, as images, a list of pages which form the document, by enlarging or reducing the page based on the enlargement/reduction ratio determined by said determination means and displaying the page at the display area size.

2. The system according to claim 1, further comprising insertion means for inserting a blank between segments set in accordance with the display area size.

3. The system according to claim 1, further comprising:

judgment means for judging, from a ratio of a width and height of the display area size and a ratio of a width and height of each page image, whether or not to rotate the page; and rotation means for rotating the page in accordance with a judgment result of said judgment means so as to display the rotated image.

4. The system according to claim 1, wherein the host apparatus comprises said setting means, said acquisition means, said calculation means, said determination means, and said display means.

5. A printing apparatus which receives document data of a document generated in a host apparatus and formed from a plurality of pages, and prints an image based on the document data on a printing medium, the printing apparatus comprising:

segment unit size setting means for setting a segment unit size serving as a unit of a display area for displaying, as images, a list of pages which form the document;

acquisition means for acquiring a width and a height of each page image from the received document data;

calculation means for, when a value of a ratio of the width and the height of the page acquired by said acquisition means exceeds a predetermined value, calculating, from the segment unit size, a display area size having a display region larger than the segment unit size;

determination means for determining, for a page having the value of the ratio exceeding the predetermined value, an enlargement/reduction ratio so as to fit the page into the display area size; and display means for displaying, as images, a list of pages which form the document, by enlarging or reducing the page based on the enlargement/reduction ratio determined by said determination means and displaying the page at the display area size.

6. A preview method for a printing system including a host apparatus which generates document data of a document formed from a plurality of pages, and a printing apparatus which receives the document data from the host apparatus and prints an image based on the document data on a printing medium, the method comprising the steps of:

setting a segment unit size serving as a unit of a display area for displaying, as images, a list of pages which form the document;

acquiring a width and a height of each page image from the document data;

calculating, from the segment unit size, and when a value of a ratio of the width and the height of the page acquired in the acquiring exceeds a predetermined value, a display area size having a display region larger than the segment unit size;

determining, for a page having the value of the ratio exceeding the predetermined value, an enlargement/reduction ratio so as to fit the page into the display area size; and displaying, as images, a list of pages which form the document, by enlarging or reducing the page based on the enlargement/reduction ratio determined in the determining and displaying the page in a display screen at the display area size.

7. A computer-readable storage medium storing a program for causing a computer to execute the method of claim 6.

* * * * *